Figure 9:
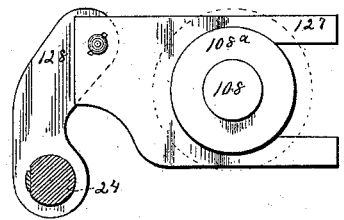
Figure 10:
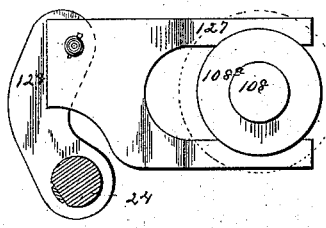

(No Model.) 10 Sheets—Sheet 1.
S. T. NEWMAN.
WIRE BENDING AND FORMING MACHINE.
No. 384,999. Patented June 26, 1888.
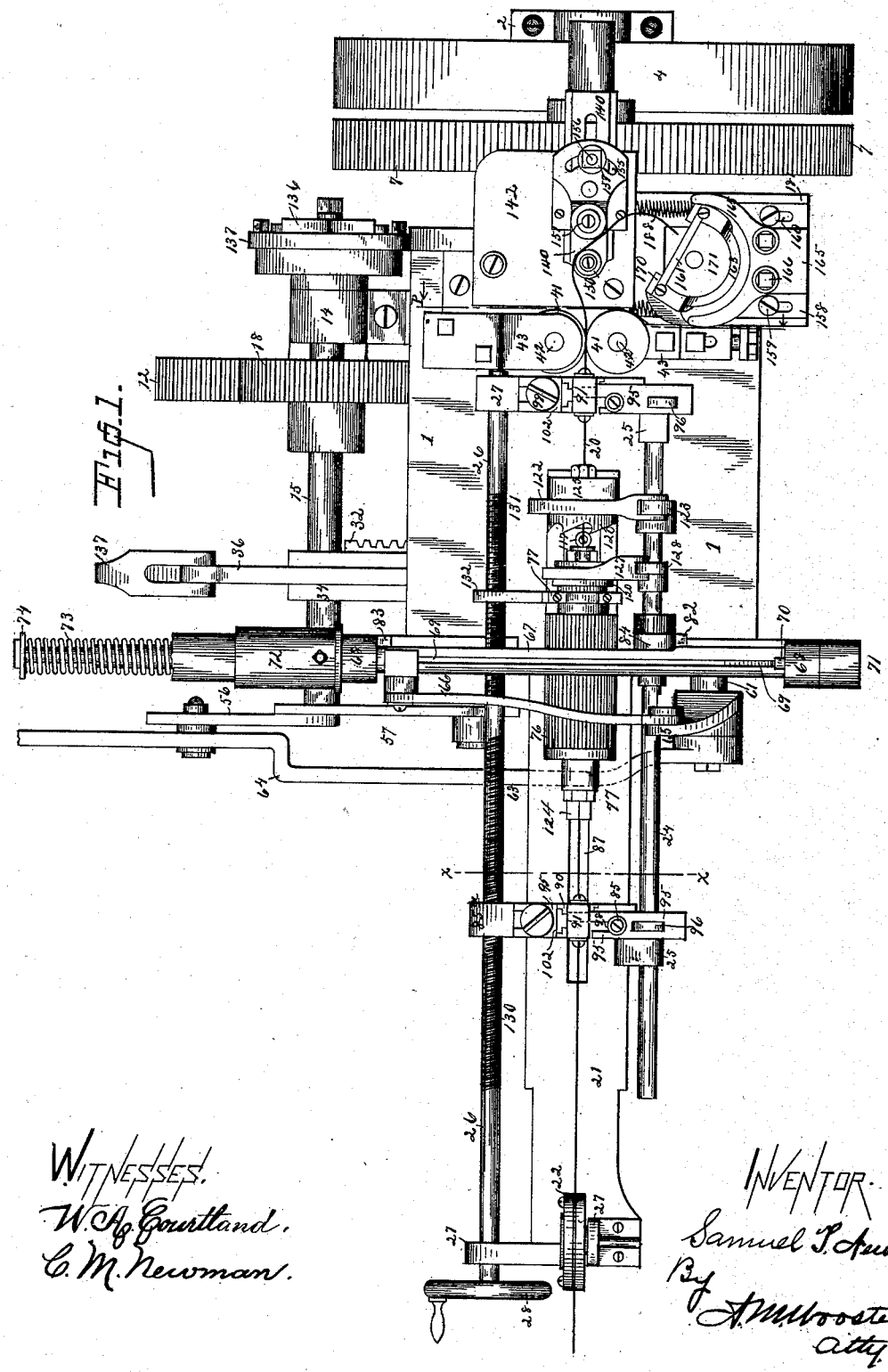

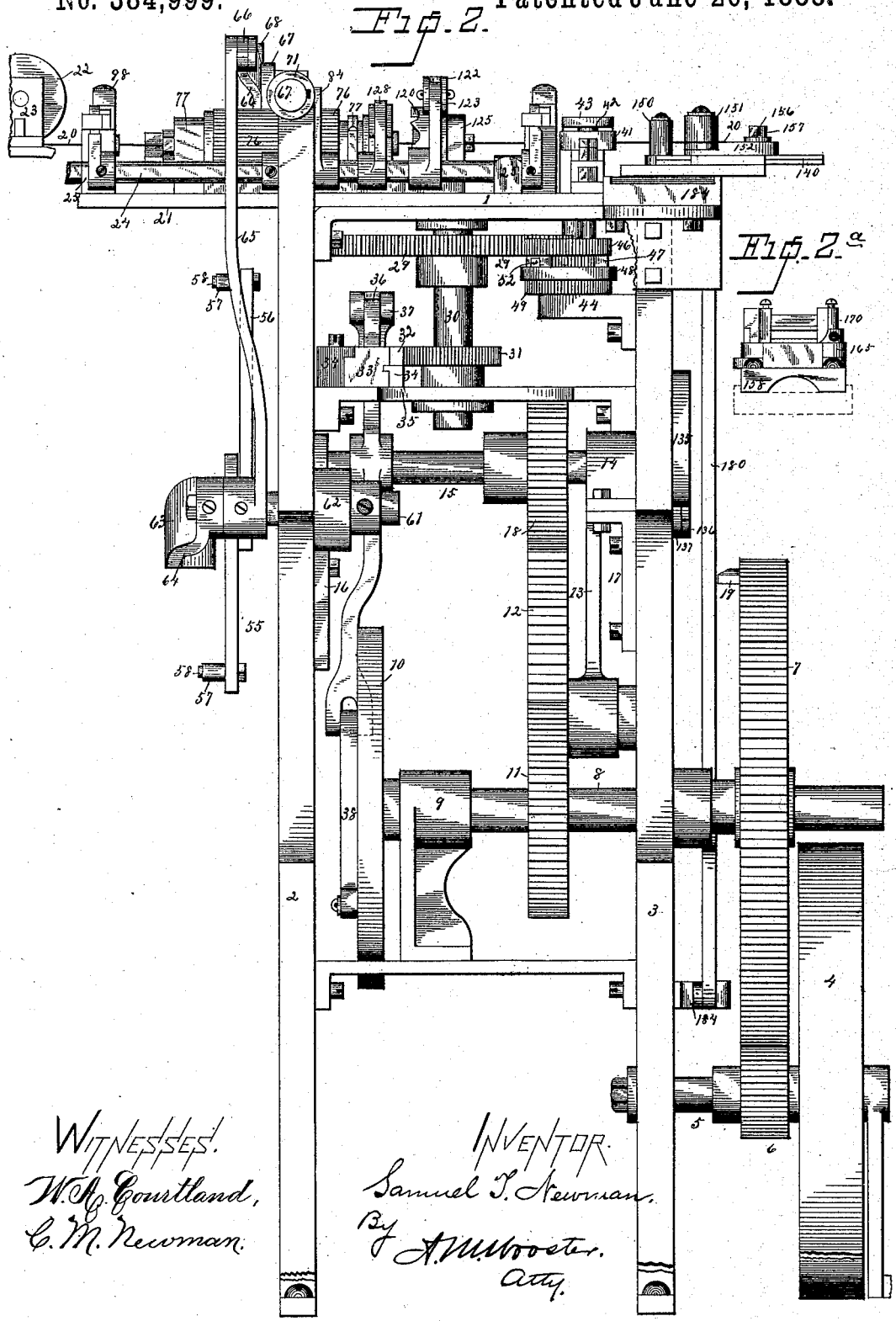

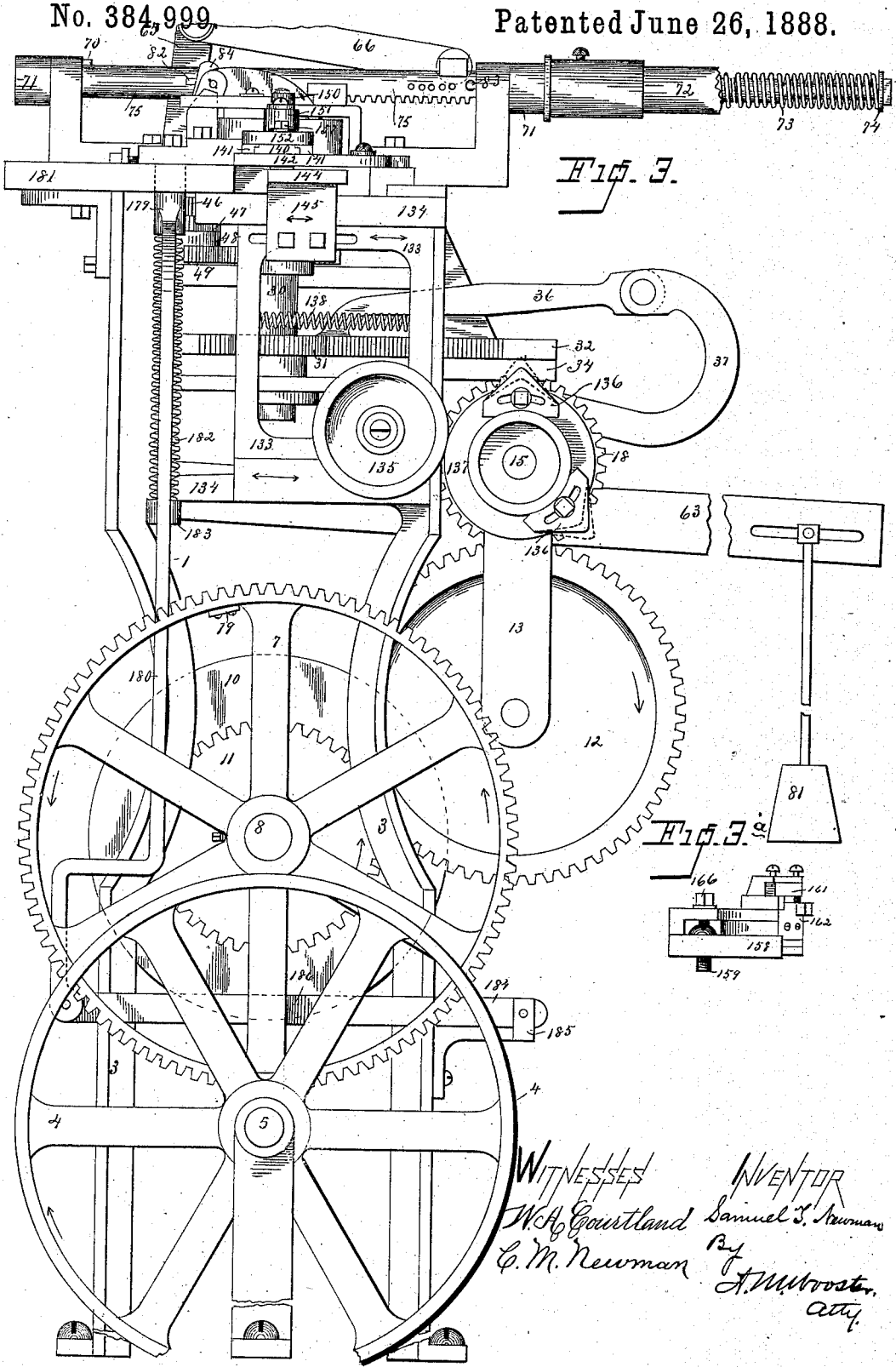

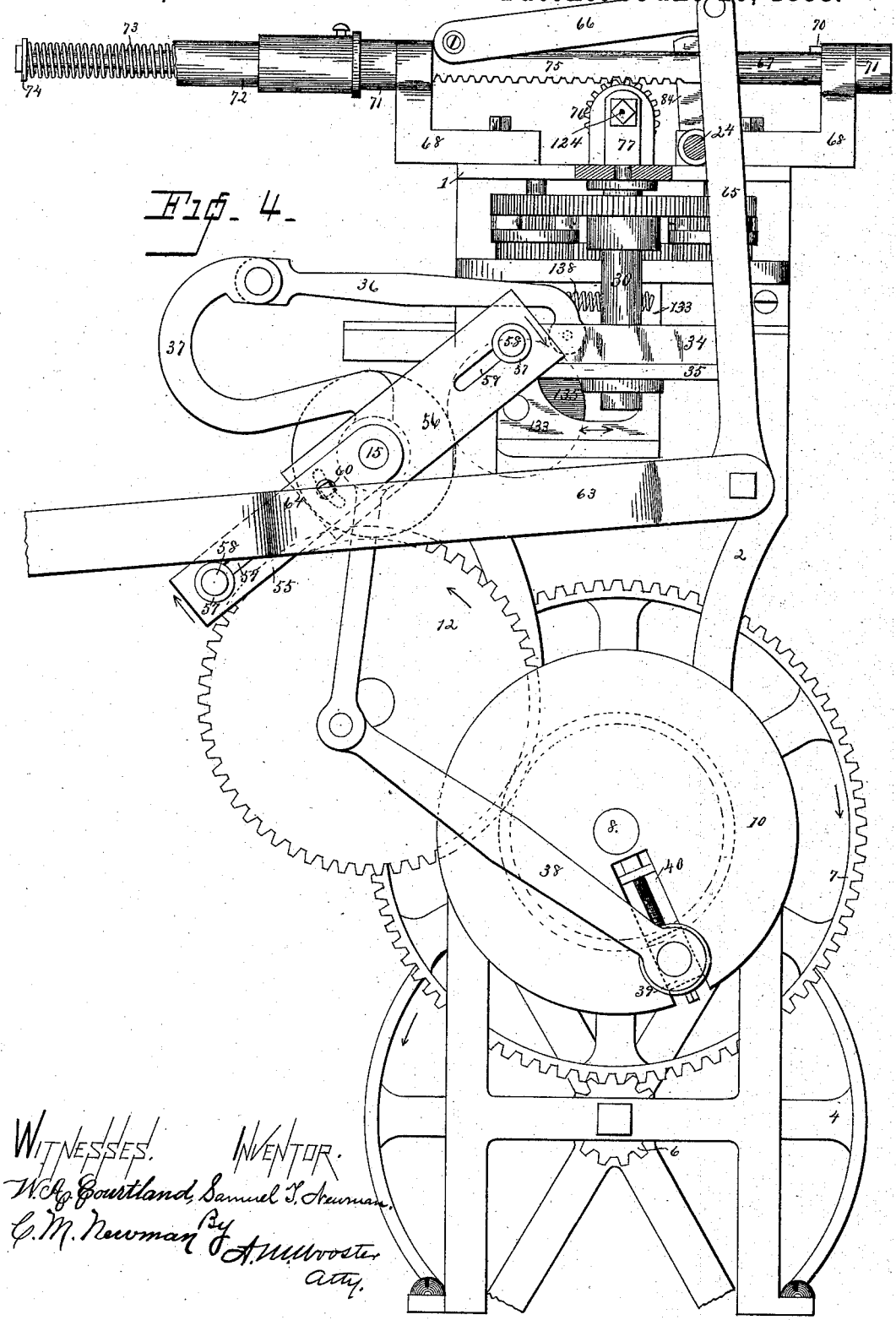

(No Model.) 10 Sheets—Sheet 5.
S. T. NEWMAN.
WIRE BENDING AND FORMING MACHINE.
No. 384,999. Patented June 26, 1888.
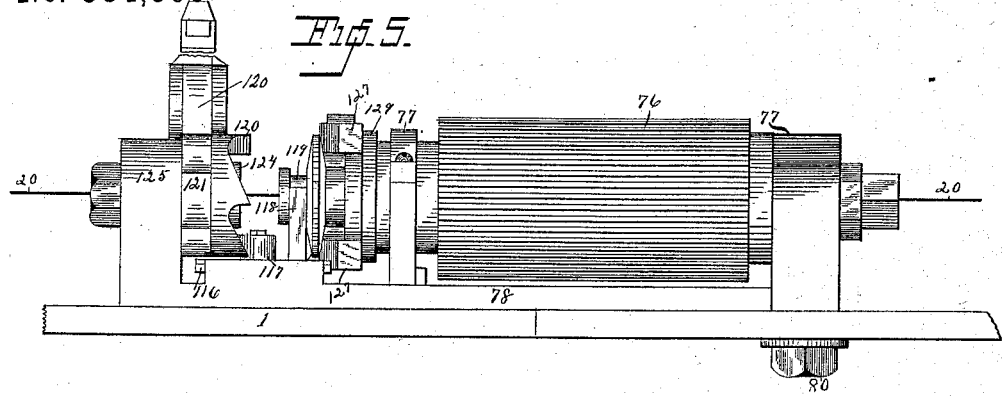
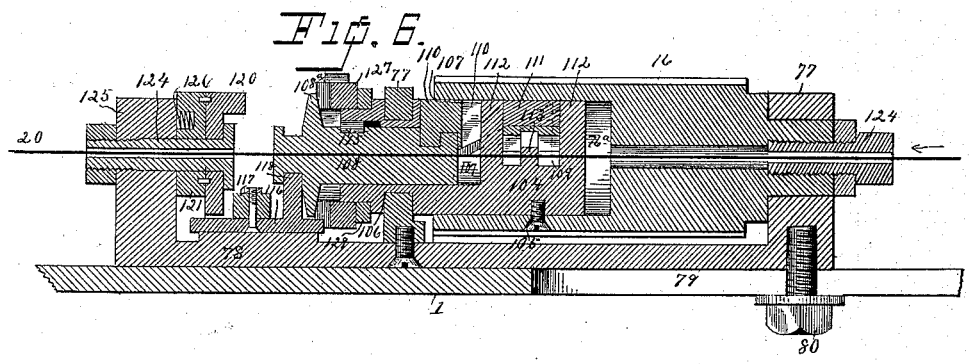
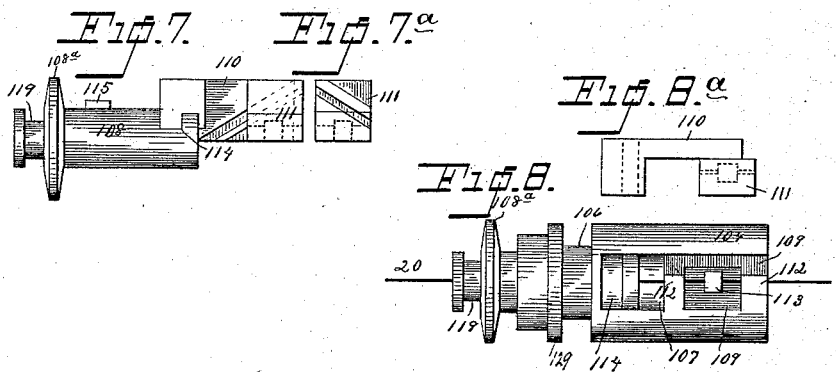
Witnesses:
W. A. Courtland
C. M. Newman
Inventor:
Samuel T. Newman
By A. M. Wooster,
Atty.
N. PETERS, Photo-Lithographer, Washington, D. C.

(No Model.) 10 Sheets—Sheet 6.

S. T. NEWMAN.
WIRE BENDING AND FORMING MACHINE.

No. 384,999. Patented June 26, 1888.

WITNESSES:
H. A. Courtland.
C. M. Newman,

INVENTOR:
Samuel T. Newman.
By F. M. Wooster.
Atty.

(No Model.) 10 Sheets—Sheet 7.
S. T. NEWMAN.
WIRE BENDING AND FORMING MACHINE.
No. 384,999. Patented June 26, 1888.
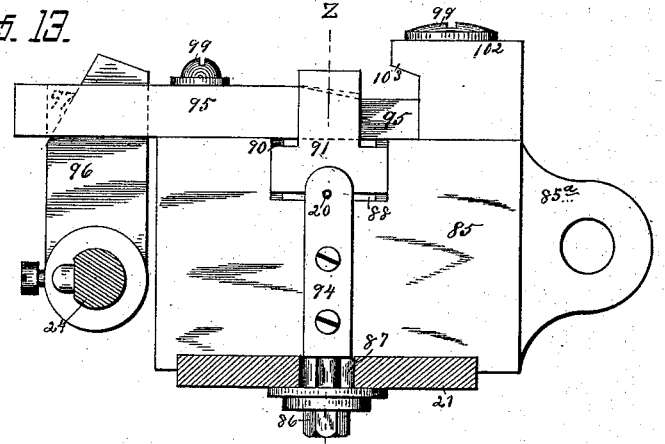
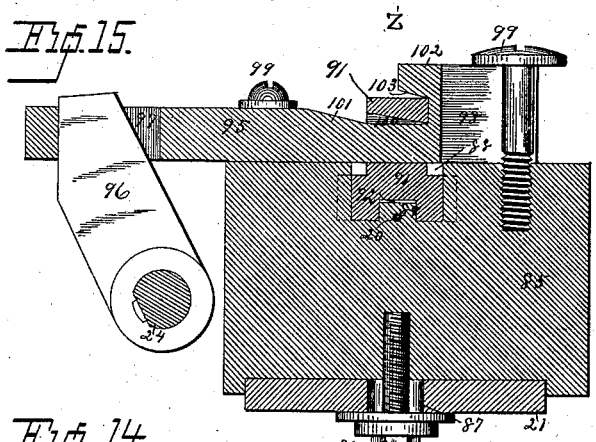
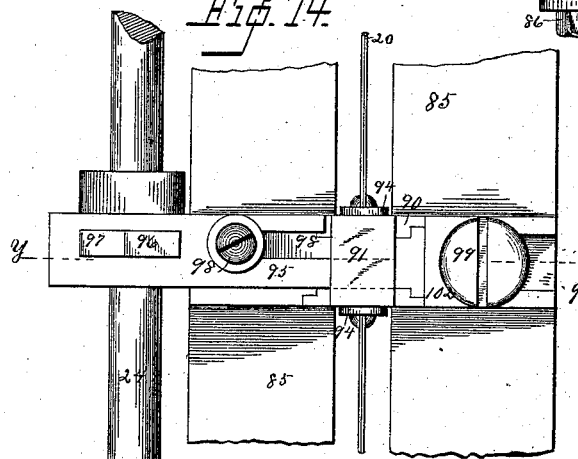
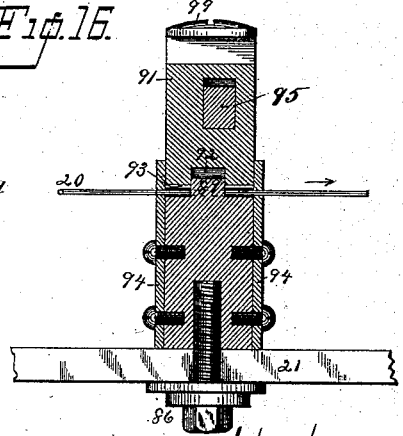
WITNESSES.
W. A. Courtland,
C. M. Newman.
INVENTOR.
Samuel T. Newman.
By A. M. Wooster, atty.

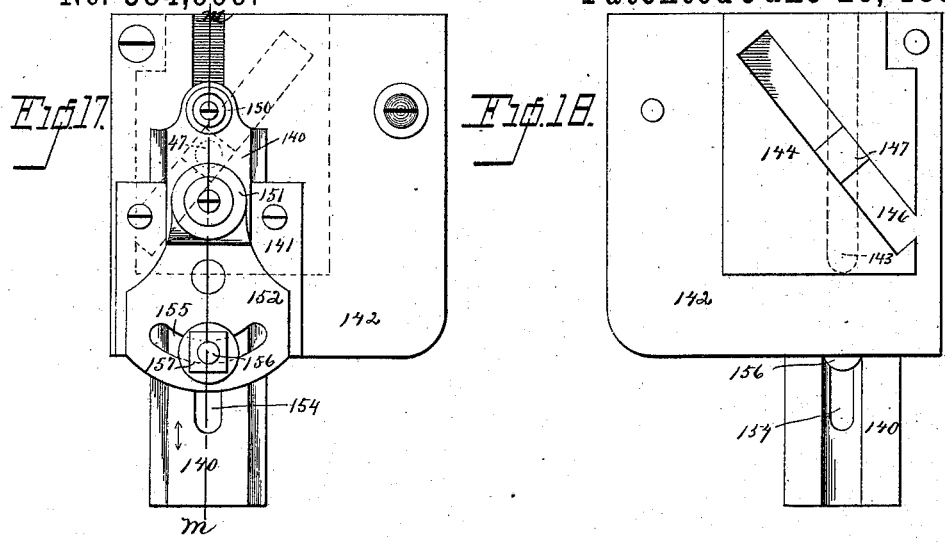

(No Model.) 10 Sheets—Sheet 9.
S. T. NEWMAN.
WIRE BENDING AND FORMING MACHINE.
No. 384,999. Patented June 26, 1888.
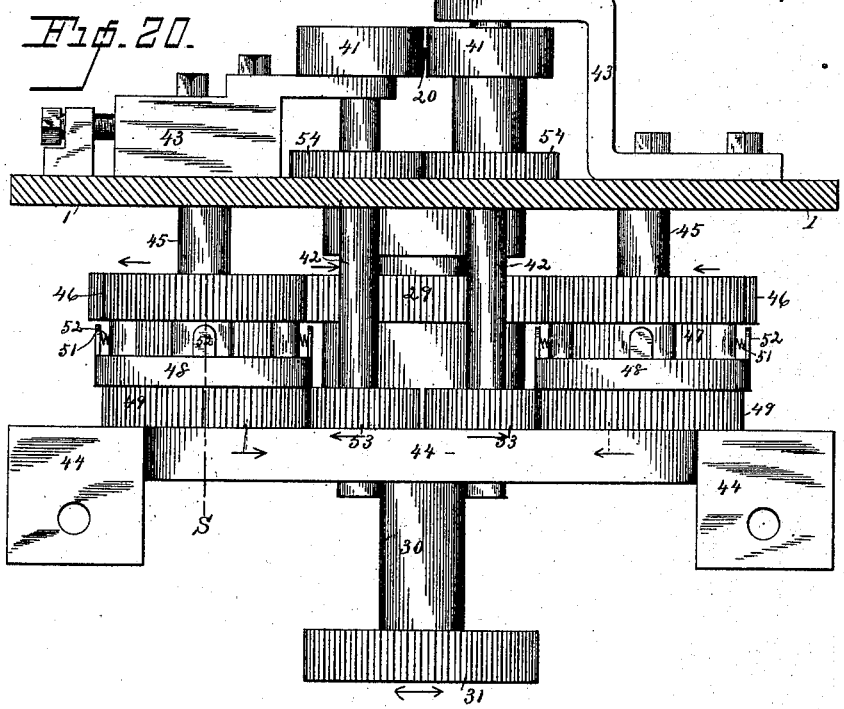
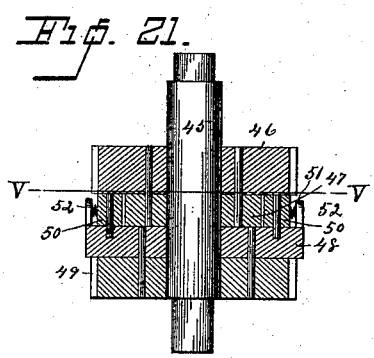
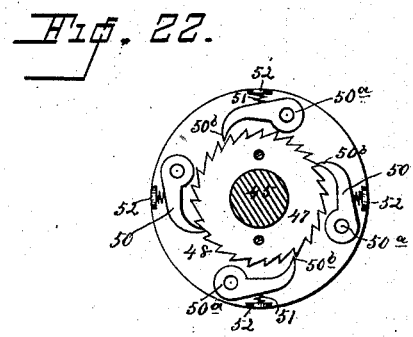
Witnesses:
W. A. Courtland.
C. M. Newman.
Inventor:
Samuel T. Newman.
By F. W. Wooster.
Atty.

(No Model.) 10 Sheets—Sheet 10.
S. T. NEWMAN.
WIRE BENDING AND FORMING MACHINE.
No. 384,999. Patented June 26, 1888.
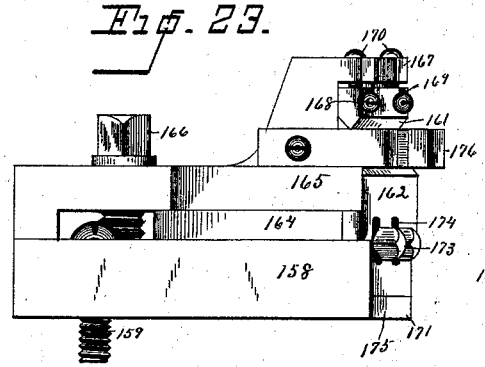
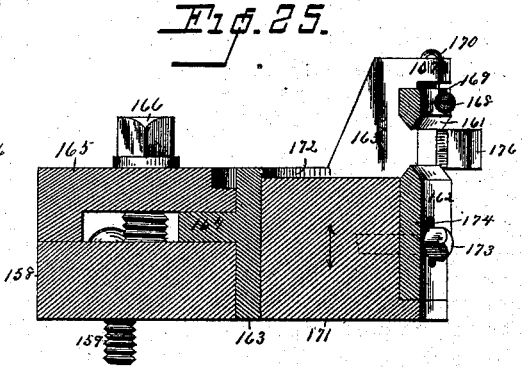
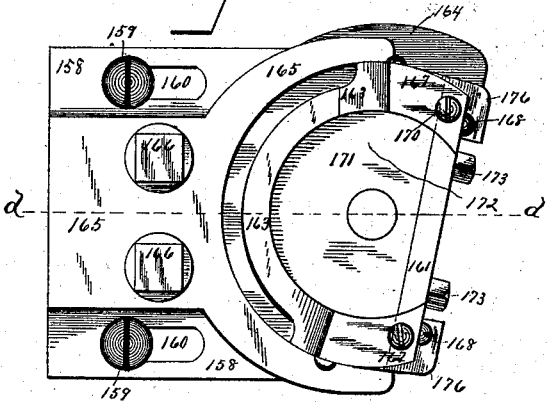
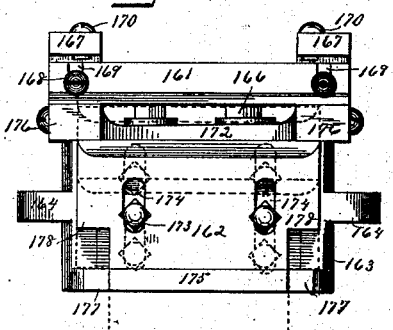
WITNESSES.
W. A. Courtland.
C. M. Newman.
INVENTOR.
Samuel T. Newman
By A. M. Wooster.
Atty.

UNITED STATES PATENT OFFICE.

SAMUEL T. NEWMAN, OF DANBURY, CONNECTICUT, ASSIGNOR OF TWO-THIRDS TO THE HAT WIRE COMPANY, OF SAME PLACE.

WIRE BENDING AND FORMING MACHINE.

SPECIFICATION forming part of Letters Patent No. 384,999, dated June 26, 1888.

Application filed March 19, 1888. Serial No. 267,608. (No model.)

*To all whom it may concern:*

Be it known that I, SAMUEL T. NEWMAN, a citizen of the United States, residing at Danbury, in the county of Fairfield and State of Connecticut, have invented certain new and useful Improvements in Wire Bending and Forming Machines; and I do hereby declare the following to be a full, clear, and exact description of the invention, such as will enable others skilled in the art to which it appertains to make and use the same.

My invention has for its object to produce a machine of this class which will bend and form polygonal wire, imparting to it at the same time more or less twist, so that the completed articles are greatly strengthened to resist pressure, and at the same time any desired "set" may be given to them.

It is necessary, of course, in machines of this class that adjustments should be provided to regulate the length of wire used in each article and to regulate its curvature in any desired plane. My improved machine is adapted to the production of almost any style of wire article which requires bending and forming, and is provided with cutting mechanism to separate the completed article from the piece of wire.

The special object in view in building my present machine was to produce a grade of wires for hat-brims which, while superior in every respect, could be produced automatically and at a remarkably high rate of speed. It is of course well understood that the general form of a hat-wire is that of an ellipse more or less elongated, and that the wires are highest at the sides, with more or less set at front and rear. The purpose of these wires is to strengthen the brim and to hold the set. It is apparent that a slight torsion of the wire will add greatly to its ability to resist pressure in any direction. I therefore use polygonal wire, ordinarily hexagonal—such, for instance, as is shown in patent to L. B. Somers, No. 333,688, dated January 5, 1886—and impart sufficient torsion to the wire to give it the greatest possible strength to resist compressive strain from all directions and at the same time to give it the desired set. In order to produce these wires at the greatest speed and at the least cost, I have devised the novel machine of which the following description, in connection with the accompanying drawings, is a specification, the same numbers being used to denote like parts wherever they appear.

Figure 11:
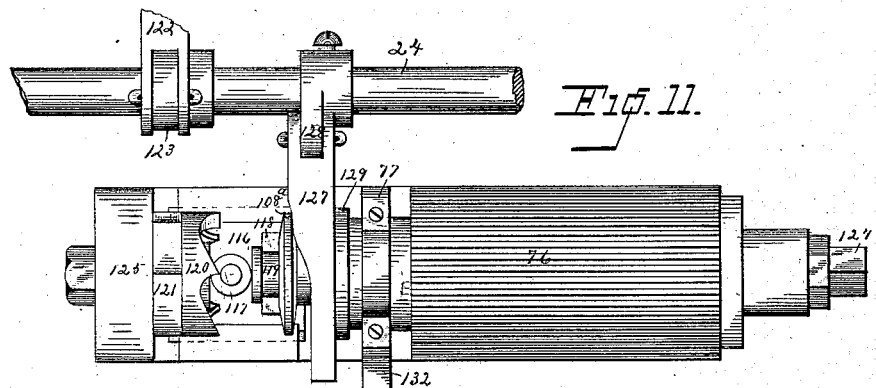
Figure 12:
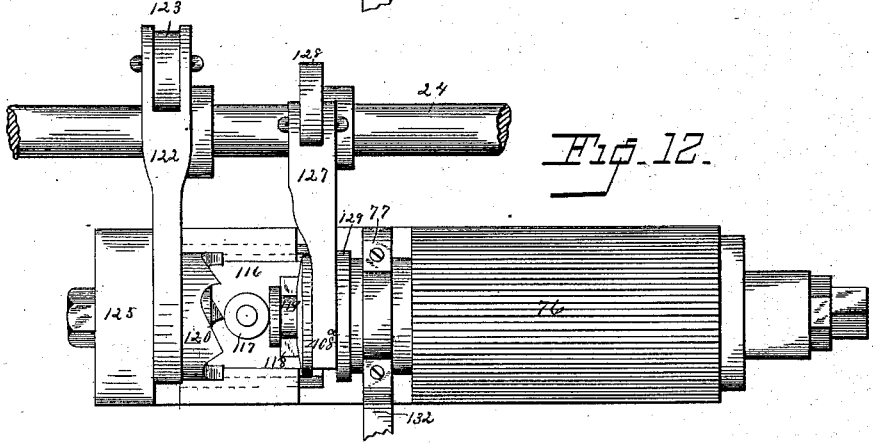

Figure 1 is a plan view of the entire machine; Fig. 2, a front elevation, the cutter being removed; Fig. 2ª, a front elevation of the cutter detached; Fig. 3, a side elevation as seen from the right in Fig. 2, the cutter being removed; Fig. 3ª, a side elevation of the cutter detached; Fig. 4, a side elevation as seen from the left in Fig. 2, the leg on that side being removed. The position of the parts in all of these views is that in which a completed wire has been cut off and the forming of a new wire is about to be commenced. Fig. 5 is an elevation on an enlarged scale of the twisting mechanism as seen from the back in Fig. 2, the grip being in the unlocked position—that is, the position in which the wire passes freely through the drum—and the pawl being lifted from the ratchet for clearness in illustration; Fig. 6, a longitudinal section corresponding with Fig. 5. Figs. 7, 7ª, 8, 8ª, 9, and 10 are detail views illustrating the construction and operation of the grip; Fig. 11, a plan view corresponding with Fig. 5; Fig. 12, a similar view, the grip being in the locked position; Fig. 13, a section on an enlarged scale on the line $x\,x$ in Fig. 1, looking in the direction of the arrow, showing the left holding-clamp in the open position; Fig. 14, a plan view corresponding with Fig. 13;-Fig. 15, a vertical section on the line $y\,y$ in Fig. 14, but showing the clamp in the closed position; Fig. 16, a vertical section on the line $z\,z$ in Fig. 13, the clamp being in the open position; Fig. 17, a plan view of the bending mechanism detached; Fig. 18, a reversed plan view thereof; Fig. 19, a vertical section on the line $m\,m$ in Fig. 17, showing also the manner in which the bending device is attached to the traveling frame; Fig. 20, an enlarged detail view showing the feeding mechanism in elevation, the bed-plate being in section on the line denoted by P in Fig. 1, the view being toward the left; Fig. 21, a section on the line denoted by $s$ in Fig. 20; Fig. 22, a section on the line $v\,v$ in Fig. 21; and Figs. 23, 24, 25, and 26 are respectively a side elevation, plan view, section on the line d d, and front elevation of the cutting mechanism detached on an enlarged scale.

1 denotes the bed of the machine, 2 the left leg, and 3 the right leg.

Power is applied to the machine by a belt (not shown) running over driving-pulley 4, whose shaft 5 is journaled in the right leg of the machine and in a bracket resting on the floor.

6 is a pinion on shaft 5, which meshes with a gear, 7, on a shaft, 8, journaled in the right leg and in a bracket, 9, supported by a cross-piece. At the right—that is, the inner end—of shaft 8 is a crank-disk, 10, which actuates the feeding mechanism, the operation of which will presently be explained.

11 is a pinion on shaft 8, which meshes with an intermediate gear, 12, journaled in a hanger, 13, depending from a bearing, 14, which supports the right end of a shaft, 15. This shaft actuates the twisting and also the forming and bending mechanism. The bearing for the opposite end of this shaft is in a bracket, 16, upon the left leg. Bearing 14 is supported by a bracket, 17, bolted to the right leg. Shaft 15 carries a pinion, 18, and receives motion through the engagement of said pinion with intermediate gear, 12. The cutting mechanism is operated by a cam, 19, secured to the inner periphery of gear-wheel 7. The operation of this mechanism will presently be fully explained.

It will thus be seen that the machine, as a whole, comprises four mechanisms, the joint action of which produces the completed article. Two of these mechanisms—that is, the feeding mechanism and the cutting mechanism—are actuated by shaft 8. The other two mechanisms—that is, the twisting mechanism and the forming and bending mechanism—are actuated by shaft 15.

It will of course be understood that the actuating mechanism herein shown and described is not of the essence of my invention. I have, however, described briefly a special form of actuating mechanism in order to make clear the operation of the machine.

Turning now to Figs. 1 and 2, the wire (denoted by 20) passes in at the left of the machine. 21 is an extension of the bed, at the left of which is a grooved guide-roller, 22, carried by a bracket, 23, secured to or made integral with said extension. The wire in being fed to the machine passes through this groove, which holds it with sufficient firmness to insure its being retained in suitable position to be acted upon. 24 is a rock-shaft journaled in brackets 25, one of which projects upward from the bed, the other from the extension thereof. This rock-shaft receives movement from shaft 15, as will presently be fully explained. 26 denotes a double-threaded shaft journaled in brackets 27, one of which is secured to the bed, the other to the extension thereof. The function of this shaft is to adjust the left holding-clamp and the twisting-drum, said shaft being operated by a hand-wheel, 28.

In view of the fact that the feeding mechanism is actually the first to operate in the formation of each article—in the present instance a hat-wire—I will first describe the construction and operation of the feeding mechanism in detail, and will then describe the twisting mechanism in detail.

The feeding mechanism receives motion from a gear-wheel, 29, on a vertical oscillating shaft, 30, journaled in any suitable manner under the bed of the machine. This shaft also carries a pinion, 31, which is engaged by a rack, 32, upon a slide, 33, reciprocating in ways 34, (shown in the present instance as secured to a cross-piece, 35, which also supports the lower end of shaft 30.)

36 is a link pivoted to the slide, at the outer end of which is pivoted a curved and recurved lever, 37, which is fulcrumed upon shaft 15, its movements, however, being wholly independent of the movements of said shaft.

38 denotes a link, one end of which is pivoted to the lower end of lever 37, the other end being pivoted to a block, 39, which is made adjustable in any suitable manner in a slot, 40, in crank-disk 10. This adjustment is an important feature of the machine, as it enables me to regulate the quantity of wire fed to the machine for each hat-wire, without substitution of parts, and in an instant's time.

The feeding mechanism as a whole is clearly illustrated in Fig. 20. (See also Figs. 1, 2, 3, and 4.)

41 denotes the feed-rollers by which the wire is gripped and drawn forward. These rollers are carried by shafts 42, which are journaled in brackets 43 above the bed and in a bracket, 44, secured to the right leg under the bed.

45 denotes two pins the upper ends of which are secured in the bed-plate and the lower ends in brackets 44. 46 denotes gears which turn freely on these pins, one gear on each pin, said gears meshing with oscillating gear 29 on shaft 30, on opposite sides thereof. Underneath these gears are ratchets 47, which are rigidly secured to said gears, so as to move therewith. Underneath the ratchets are disks 48, and underneath the disks are gears 49, which are rigidly secured to the disks, so as to move therewith.

50 denotes pawls carried by the disks, which are adapted to engage ratchets 47, and 51 springs which bear against lugs 52 on the disks and against the pawls to hold them in engagement with the ratchets. (See Figs. 20, 21, and 22.)

It will of course be seen that as gear-wheels 46 both receive motion from gear-wheel 29 they will move together in the opposite direction from that in which gear-wheel 29 is moving, and that their motions will be reversed by the return movement of oscillating gear-wheel 29. It is apparent, therefore, that in order to impart rotary movement in opposite directions to the two feed-rollers the ratchets must be placed with their teeth inclined in opposite directions, the pawls being of course placed to correspond with the inclination of the teeth of the ratchets.

In order to illustrate the operation of the two sets of pawls more clearly, I have denoted the bases of the pawls by 50 and their points by $50^a$.

Fig. 21 shows the left ratchet and pawls in section, and Fig. 22 shows the same ratchet and pawls in plan.

53 denotes pinions on shafts 42, which are engaged by the respective gears 49, but do not engage each other; and 54 denotes the feed-gears on shafts 42, said gears being shown as above the bed-plate.

The operation of this portion of the machine is as follows: It is apparent that each rotation of shaft 8 will produce a reciprocation of rack 32, which in turn will impart an oscillation to vertical shaft 30 and gear-wheel 29, carried thereby. The amount of oscillation of this gear-wheel will of course depend upon the adjustment of link 38 to crank-disk 10. If large-sized hat-wires are being made, block 39 is of course moved farther from the center of the crank-disk than when making small-sized wires. In practice I contemplate placing a gage at the side of slot 40 for the adjustment of block 39, so that the feeding mechanism may be instantly regulated by said gage to produce wires of any desired length. As a matter of fact, the movement of gear-wheel 29 may be more or less than a complete revolution in each direction. Supposing the position of the parts in Figs. 3 and 20 to correspond, the forward movement of the rack—that is, toward the left in Fig. 3—will turn gear-wheel 29 toward the right. In Fig. 20 I have indicated the direction of rotation of the various gears at this instant by arrows. Both of the gears 46 will be rotating toward the left. Supposing now that the teeth of the right ratchet 47 are inclined in the opposite direction—that is, toward the right, as viewed in Figs. 20, 21, and 22—it is apparent that said ratchet will be engaged by its pawls, and consequently that the movement of the ratchet will carry the right disk, 48, and the right gear-wheel 49 with it toward the left. The movement of gear-wheel 49 toward the left will cause the right pinion 53 on the right shaft 42 to move toward the right, carrying the right feed-gear and the right feed-roller also toward the right, and the engagement of the right feed-gear 54 with the left feed gear, will carry said left feed-gear and the left feed-roller toward the left, so that the action of the two feed-rollers will be to draw the wire forward from the left of the machine. While the movements just described of the parts journaled on the right pin 45 are taking place, the left gear-wheel 49 on the left shaft 45 will be moving toward the right, as it will necessarily be carried by the engagement therewith of the left pinion 53 on the left shaft 42. As we have already referred to the teeth of the right ratchet 47 as being inclined toward the right, it is obvious that the teeth of the left ratchet 47 must be inclined toward the left. (See Fig. 22.) The movement of the left gear-wheel 46 being toward the left, it is furthermore apparent that the left set of pawls, 50, must be dragged over the surface of the left ratchet 47 so that at this instant the gear-wheel 46 and the ratchet 47 upon the left pin 45 will be moving toward the left, and the disk and the gear-wheel 49 upon the left pin 45 will be moving toward the right. This movement of the various parts will continue until the forward movement of rack 32—that is, the movement toward the left, as seen in Fig. 3—is completed. When the rack is at the extreme of its movement toward the left, it is apparent that crank-disk 10 and link 38 will be at the extremity of their throw toward the left, as seen from the point of view in Fig. 4, it being understood, of course, that Fig. 4 is a view from the left of the machine, and Fig. 3 a view from the right thereof. The position of the parts in both figures corresponds, as already stated, that position being at the beginning of the movement which has just been described.

The reverse position of the parts from that shown—that is, the position at the end of the movement just described—is so obvious that it was not deemed to require illustration. At the instant that the crank-disk is passing each of its dead-centers—that is, the two points at which the pivotal point of said disk and the pivotal point of the link to the disk are in line with each other—there will be a stoppage for an instant of the movements of the feed-rollers. During this instant the twisting mechanism (which will presently be explained,) is acting. As shown in Fig. 4, one of the dead-centers—that at the beginning of the forward movement—has just been passed. The other occurs at the completion of the movement of the feeding mechanism which has just been described—that is, when rack 32 is at the extremity of its movement toward the left—this being the reverse of the position shown in Figs. 3 and 4. At the completion of the operation of the twisting mechanism (which will presently be described in detail) rack 32 begins to move backward from the extremity of its movement to the left, toward the position in which it is shown in Fig. 3. This causes a reversal of the movement of several of the parts shown in Fig. 20. Oscillating gear-wheel 29 will now move toward the left and gear-wheels 46 toward the right. The left ratchet 47 will now be engaged by its pawls and carried forward, so that the left disk 48 and the left gear-wheel 49 will be carried thereby. It should be noted that the disk 48, gear-wheels 49, pinions 53, the feed-gears, &c., always move in the same direction. The right gear 49, as seen in Fig. 20, moves toward the left, and the left gear 49 moves toward the right. The difference in operation is this: In the movement first described—that is, while the rack is moving toward the left—the right gear 49 drives and the left gear 49 is driven. In the present movement this is reversed. The left disk and the left gear-wheel 49 are carried forward by the engagement of the ratchet and pawls on that side, so that the left gear-wheel 49 drives the left pinion 53, and with it the left shaft 42, the left feed gear 54, and the corresponding feed-roller toward the left. The left feed-gear 54 drives the right feed-gear 54 toward the right, carrying, of course, the right shaft 42, the right feed-roller, and the right pinion 53, and driving the right gear 49 and the right disk. The right gear-wheel 46 is at this instant driven toward the right by gear-wheel 29, and of course carries the ratchet with it, so that at this instant the right gear-wheel 46 and ratchet 47 are moving in one direction, and the right disk 48 and gear-wheel 49 are moving in the opposite direction, the pawls sliding freely over the ratchet, as was the case with the left pawls in the former movement. The above movements are continuously repeated, the right and left gears 49 alternately driving the feed-rollers.

Turning now to Figs. 5 to 16, inclusive, the holding-clamps, twisting-drum, &c., will be found illustrated in detail, (see also Figs. 1 and 2,) as showing this mechanism in position relatively to the other parts of the machine. The parts that coact in twisting the wire are operated in the manner I will now describe.

55 and 56 denote arms secured to shaft 15, at the left end thereof, outside of the left leg. Each of these arms carries at its outer end a roller, 57, journaled on a pin, 58, said pins being adjustably secured in slots 59 in said arms. One of these arms, 56, in the present instance is provided with a curved slot, (see dotted lines, Fig. 4,) and is locked to the other arm by means of a bolt, 60, passing through arm 55 and said slot. This is in order to provide for the adjustment of said arms should it be desirable in changing the timing of the machine or for any purpose whatever.

61 denotes a short rock-shaft journaled in the left leg, (see Fig. 1,) a boss, 62, being provided to increase the length of the bearing. 63 is an arm rigidly secured to said shaft and provided with a bend or offset, 64, for a purpose presently to be explained, and 65 is an arm also rigidly secured to said shaft and extending upward at substantially a right angle to arm 63. At the upper end of arm 65 is pivoted a link, 66, the opposite end of which is pivoted to a rod, 67, which reciprocates in brackets 68, secured to the bed. (See Fig. 4.) The upper side of this rod is provided with a groove, 69, which is engaged by a guide, 70, on one of the brackets (see Fig. 1) to hold it firmly in position. Collars 71 are provided to give increased bearing for the rod. To the left one of these collars (not shown) a sleeve, 72, is secured, which extends backward and wholly covers the rear end of the rod and the spiral spring 73, which surrounds it, one end of said spring bearing against said left collar, to which the sleeve is secured, and the other bearing against a collar, 74, at the rear end of the reciprocating rod. On the under side of the reciprocating rod is a rack, 75, which engages gear-teeth on the periphery of the twisting-drum 76. This drum is journaled in standards 77, projecting upward from a frame, 78, adjustably secured longitudinally of the bed and the extension thereof.

79 denotes a slot in the bed, and 80 a bolt passing through the slot from below and engaging the frame, whereby the latter and the parts carried thereby are locked in position after adjustment.

The operation of these parts will be clearly understood from Figs. 1 and 4. Shaft 15 rotates from left to right, carrying arms 55 and 56 with it. It will be seen in Fig. 1 that arm 63 is curved outward from the shaft, so that the roller at the right, as seen in said figure, will clear it. At the portion denoted by 64, however, the arm is bent inward again at a right angle, forming an offset, and then passes straight forward, so that the rear end of said arm will be engaged by the roller at the left. When either of these rollers engages arm 63 it, of course, raises it, shaft 61 turning freely until the arm shall have reached such a position that the roller will pass off at bend or offset 64, when the arm will drop back. The raising of arm 63 from the position shown in Fig. 4 of course swings arm 65, which is likewise rigidly secured to shaft 61, toward the right, and draws reciprocating rod 67 also toward the right, the engagement of the rack on the under side of said rod with the twisting-drum acting to turn the latter toward the front, as seen in Fig. 1. This movement of the twisting-drum toward the front continues until the roller that is in engagement with arm 63 reaches the offset.

For convenience in description, let us term the movement of the reciprocating rod that has just been described—that is, toward the front of the machine, as seen in Fig. 1—the "backward" movement. It will be seen that this backward movement is made against the power of spiral spring 73. The instant that either of the rollers 57 passes off from arm 63 at the bend or offset the spring is free to act, and restores the parts to their normal position—that is, the reciprocating rod is forced forward instantly, carrying the twisting-drum with it, and arms 63 and 65 are restored to the positions shown in Figs. 1, 2, and 4. This result of restoring the parts to their normal position may be equally well secured by a weight, 81, adjustably secured at the outer end of arm 63. Both weight and spring may be used, as shown in the drawings, or weight or spring may either of them be used alone. It is simply necessary that there should be sufficient power to instantly restore the parts to their normal position, at the same time twisting the wire, as will presently be fully described.

82 and 83 (see Figs. 1 and 3) denote lugs upon rod 67, which engage an arm, 84, projecting upward from rock-shaft 24, and impart the necessary oscillation to said shaft to lock and unlock the holding-clamps and also the grip within the twisting drum, both presently to be described. In practice I make lug 83 adjustable on rod 67, as indicated in Fig. 3, this adjustment necessarily corresponding with the adjustment of rollers 57 or arms 55 and 56, to allow for wire having various degrees of temper and for the various degrees of set at the front and rear of the hat-brims. At the completion of the backward movement of rod 67, arm 84 is engaged by lug 83, the effect of which is to rock shaft 24 backward—that is, toward the front in Fig. 1. In entering the machine the wire, after leaving guide-roller 22, passes through the left holding-clamp, then through the twisting-drum and its standards, and then through the right holding-clamp and to the bending and forming mechanism. The holding-clamps are practically identical in construction, the right clamp being rigidly secured to the bed and the left adjustably secured to the extension. The position of these clamps relatively to the other parts of the machine is clearly shown in Fig. 1.

In Figs. 13 to 16, inclusive, I have illustrated the construction of the left holding-clamp in detail. The description now to be given will apply equally well to the right holding-clamp, except that the latter is not adjustable.

85 denotes a clamp-block, which is adjustably secured to the extension by a screw, 86, passing through a slot, 87, in the latter.

88 denotes a recess in the top of the block, and 89 a boss at the center of the recess, having a hole through which the wire passes. At the sides of the recess transverse to the line of movement of the wire are ways 90, which guide a vertically-movable block, 91. This block is provided in its bottom with a recess, 92, which just receives boss 89 at the bottom of recess 88.

93 denotes an angular slot extending across the bottom of block 91 in the line of movement of the wire. (See Fig. 16.)

94 denotes guides secured to the opposite sides of block 85, which are provided with openings of just sufficient size to allow the wire to pass freely.

The operation of the clamp will be clearly understood from Fig. 16. The wire passes freely through boss 89 and guides 94 and is clamped by the forcing down of block 91, the wire being firmly held between the bottom of recess 88 and the angular sides of slot 93. The block is raised and lowered by means of a slide, 95, operated by an arm, 96, upon shaft 24. For convenience in attaching the various arms to this rock-shaft, one side is preferably flattened slightly, as shown in Figs. 13 and 15, and the arms are locked in position by keys, which in turn are locked by set-screws. The arms are thus held rigidly from turning on the shaft, but at the same time may be readily moved longitudinally thereon should it be necessary in adjusting the machine to different lengths of hat-wires or in timing.

97 denotes a slot in the slide which receives arm 96, and 98 slots to receive guide-screws 99.

100 denotes a slot in block 91, through which the slide passes. The top of the slide is provided with an incline, 101, which engages a corresponding incline on the upper side of slot 100 to raise the block when the slide is forced forward. (See Figs. 15 and 13.) Upon the forward end of the slide is a projection, 102, having upon its under side an incline, 103, which engages the top of block 91 to force the latter down to clamp the wire. It should be understood that the block 85, vertical block 91, slide 95, arm 96, &c., of the right holding-clamp are identical in every respect with those of the left.

Turning now for an instant to Fig. 1, it will be seen that when rock-shaft 24 is oscillated toward the front, arms 96 and the slides will be thrown to the position shown in Fig. 15. This will draw the slide backward, and the engagement of incline 101 with the top of block 91 will force the latter down upon the wire, clamping it firmly. The wire is thus held firmly at both clamps during the forward or return movement of the twisting-drum. The instant the forward movement of the twisting-drum is completed shaft 24 will be oscillated toward the back of the machine in the manner already explained. This will force the slide forward, as in Figs. 13 and 14, raising block 91 by the engagement of the inclines and leaving the wire free to pass through guides 94 and boss 89, as clearly shown in Fig. 16. The construction of the twisting-drum is clearly illustrated in Fig. 6. The drum proper—that is, the shell having gear teeth on its periphery—has already been designated as 76. Within this shell, in an opening, 76ª, at the left end, is a cylindrical piece, 104, which is secured to the drum by a set-screw, 105. The right end of the drum is journaled in the right standard 77, and the left end of piece 104 is journaled in the left standard 77, piece 104 being provided with a circular groove, 106, to receive the standard and its cap, as shown in Figs. 5, 6, and 8. The left end of piece 104 is provided with a central opening, 107, to receive a plunger, 108, and with a slot, 109, in one side, the left end of which leads into the central opening. The right end of this slot is of suitable shape to receive the slide 110, which is operated by the plunger, and the gripping-block 111, which is operated by the slide. The wire normally passes freely through all of the mechanism carried by the sliding frame 78.

The construction of the grip in the twisting mechanism resembles in its mode of operation the holding-clamps already described.

112 denotes guides for the wire, said guides forming, preferably, an integral part of cylindrical piece 104. Between the guides 112 is the deepest portion of slot 109, from the bottom of which there projects upward a boss, 113, through which the wire passes. The bottom of the gripping-block is provided with a recess to receive this boss and with an angular groove adapted to grip the wire when the block is forced down. (See dotted lines in Fig. 8ª, which shows the slide and block as simply lifted out from slot 109, but not turned.) The lower portion of the block—that is, the portion that grips the wire—is preferably made of case-hardened steel, and is secured to the upper portion in any suitable manner, the two parts of the block being indicated clearly in Figs. 7 and 7ª. The right end of the plunger is provided with a groove, 114, and the left end of the slide is provided with a corresponding groove and projection by which the parts are connected together. The face of the slide is provided with a diagonal dovetail spline and groove, and the face of the block with a corresponding diagonal spline and groove, these two parts being shown separately and attached in Figs. 7 and 7ª. In assembling, the slide and block are engaged, as in Fig. 8ª, the plunger is passed into the opening in part 104, and then the slide and block are dropped into slot 109. It will readily be seen that when the plunger is drawn out block 111 is lifted away from the wire, and when the plunger is forced into said block is clamped down firmly upon the wire by the action of the diagonal splines and grooves. The plunger and part 104 are held against rotation independently of each other by a spline or key, 115, in one of the parts—in the present instance the plunger—which engages a corresponding groove in the other part, as clearly shown in Fig. 6.

116 denotes a sliding plate carrying a roller, 117, and having at its right end a bearing or half-socket, 118, which engages a groove, 119, at the left end of the plunger.

120 denotes a crown-ratchet, the teeth of which are adapted to engage roller 117, the effect of which, when the sliding plate and roller are forced toward the right by one of the teeth of the ratchet, is to force the plunger and slide 110 toward the right, which clamps block 111 down firmly upon the wire, as just explained. Back of the crown-ratchet is a ratchet, 121, which is engaged by a hooked pawl, 122, pivoted to an arm, 123, carried by rock-shaft 24. The crown-ratchet and ratchet 121 are locked together by pins, as shown in Fig. 6, and are journaled upon a screw-pin, 124, which passes through a standard, 125, upon the sliding frame, and is provided with a central opening through which the wire passes. The screw-pin is locked in position by a check-nut, or in any suitable manner.

126 is a friction spring socketed in ratchet 121, which bears against the face of the standard and acts to hold the ratchet and crown-ratchet in any position to which they are carried by the hooked pawl, so that when the pawl moves backward over the teeth of ratchet 121 there shall be no danger of the position of the ratchet becoming shifted. A similar screw-pin, 124, is provided at the opposite end of the sliding frame, through which the wire passes, these screw-pins merely serving as guides, but having no action on the wire. They are made independent, so that they may readily be replaced in the event of becoming worn. The return movement of the plunger and slide 110, by which the gripping-block is raised from the wire, is effected by a sliding double cam, 127, which is pivoted to an arm, 128, secured to rock-shaft 24, and engages a collar, 108ª, on the plunger.

129 is a hardened-steel collar on cylindrical piece 104, against which the back of the cam bears in forcing out the plunger. It will be seen from Figs. 11 and 12 that arms 123 and 128 are so adjusted upon rock-shaft 24 that the hooked pawl 122 and the sliding cam 127 act alternately. While the hooked pawl is imparting a forward movement to ratchet 121 and the crown-ratchet, the action of which is to force the plunger in, as already explained, the sliding cam is moving out of the way, so as to permit the crown-ratchet to force the slide, plunger, &c., forward to the position shown in Fig. 12. In practice, having forced the sliding plate and plunger forward, the tooth of the crown-ratchet that has been in engagement with the roller will pass beyond it, so that when the backward movement takes place the roller will pass in between two teeth of the crown-ratchet, as shown in Fig. 11. The forward movement of the twisting mechanism takes place when the plunger and slide 110 are at their position toward the right, and the gripping-block is forced down upon the wire. This gripping of the wire by the twisting mechanism and the gripping by the holding-clamps, already explained, take place simultaneously. While the wire is thus gripped by the two holding-clamps and gripped midway between the two holding-clamps by the mechanism just explained, what I term the "forward" movement of the twisting mechanism, as already explained, takes place. This movement imparts any desired twist to the wire, the amount of twist required depending upon the degree of temper in the wire and the amount of set required at the front and rear of the hat-brims. When it is desired to increase the amount of twist given to the wire at each operation of the twisting mechanism, rollers 57 are moved outward in the slots at the ends of arms 55 and 56. This causes arm 63 to be raised higher at each movement before it is released by the passing off of the roller at the offset. The increased movement of arm 63 correspondingly increases the movements of arm 65, the link, and the rack that engages the twisting-drum, thus turning the latter farther backward, so that the corresponding forward movement will impart more twist to the wire. To lessen the twist given at each operation, rollers 57 are moved inward, so that arm 63 is not lifted so high before the roller passes off at the offset. Consequently less backward movement is imparted to the twisting-drum by the rack, and less twist to the wire by the forward or return movement of the drum. It should be noted when the adjustment of rollers 57 is changed the adjustment of lug 83 on rod 67 should be changed to correspond therewith. If the rollers are moved farther out on the arms, lug 83 must be moved farther back, as seen in Fig. 1, to permit a greater throw of the rack before said lug engages arm 84 on rock-shaft 24, and thereby actuates the holding-clamps and grip. The amount of wire held between the holding-clamps and operated upon at each movement of the twisting mechanism forms one-half of a completed hat-wire, two operations of the twisting mechanism being required in the formation of each hat-wire. In order that this mechanism may be readily adjusted to different lengths of hat-wires, we provide double-threaded shaft 26, journaled in brackets 27, one of said brackets being at the left end of the extension, and the other a part of the right holding-clamp.

130 denotes a thread on shaft 26, which engages a correspondingly-threaded opening of bracket 85ª, forming part of block 85 of the left holding-clamp, and 131 denotes another thread on shaft 26 of just half the pitch of thread 130, which engages a correspondingly-threaded opening in a bracket, 132, extending from some portion of sliding frame 78, preferably one of the standards 77. (See Figs. 1, 11, and 12.)

It will of course be understood that in use it is necessary that the grip of the twisting mechanism shall be just half-way between the two holding-clamps. The right holding-clamp being rigidly attached to the bed, it follows that in order to make a single adjustment serve for the parts carried by sliding frame 78 and for the left holding-clamp it is necessary that the two parts should be carried in the same direction and that the clamp should move twice as fast as frame 78. In making this adjustment it is necessary to loosen bolts 80 and 86 and also the set-screw securing arm 96 to rock-shaft 24, turn shaft 26 until the left holding-clamp is carried to a distance from the right holding-clamp just equal to one-half the length of the hat-wire desired, and then tighten up the bolts and set-screw again.

It will be seen that the gear-teeth upon the periphery of drum 76 are amply long to permit of any adjustment that can possibly be required.

Turning now to Figs. 17, 18, and 19, in connection with Fig. 3, the bending and forming mechanism will be found clearly illustrated.

Immediately after the action of the twisting mechanism the holding-clamps and the gripper of the twisting mechanism release the wire, and the feeding mechanism acts to carry it forward. The bending and forming mechanism acts upon the wire as it leaves the feed-rollers. (For position of the parts relatively to each other see Fig. 1.)

The bending and forming mechanism is carried by a frame, 133, which slides in ways 134 in the right leg of the machine. 135 is a roller carried by this frame, which is engaged by cams 136, adjustably secured to a disk, 137, at the right end of shaft 15. It will be noticed that cams 136 are not directly in line with each other upon the disk. This is in order that the action of the bending and forming mechanism shall coincide with the action of the feeding mechanism, the latter being actuated by parts 32 36 37 38, &c. (Illustrated clearly in Fig. 3.)

It will be understood, of course, that the rotation of shaft 15, which actuates the bending and forming mechanism, is regular at all times, and, furthermore, that the time occupied by the pivotal point of link 38 to crank-disk 10 in passing the dead-center farthest from the pivotal point of lever 37 on shaft 15 is greater than that occupied in passing the nearest dead-center. It is apparent, therefore, that as the present machine is organized there will be a slight irregularity in the reciprocation of rack 32, which actuates the feeding mechanism— that is to say, the time between said movement varies slightly, depending upon the position of the opposite pivotal point of link 38 to the crank-disk. It is obvious, furthermore, that the movement of the bending and forming mechanism should be timed to correspond therewith, which is accomplished by adjustment of cams 136 upon disk 137.

138 denotes a spring the respective ends of which are connected to frame 133 and to the leg, which acts to hold roller 135 in engagement with disk 137 until the roller is acted on by one of the cams, and after the bending and forming mechanism has acted returns the frame and the parts carried thereby to their former position.

140 denotes a slide which reciprocates in ways 141 upon a plate, 142, rigidly secured to the bed. 143 denotes a longitudinal slot in this plate.

144 is a plate secured to a bracket, 145, which in turn is secured to sliding frame 133.

146 is a diagonal slot in plate 144, and 147 is a block adapted to reciprocate in said slot.

148 denotes a boss on the under side of slide 140, which engages slot 143. At the lower end of this boss is a stud, 149, which engages an opening in block 147, turning freely therein.

The operation of bending and forming the hat-wires is performed by the left and right bending and forming rollers, as seen in Fig. 1, (designated, respectively, as 150 and 151.) Roller 150 is pivoted upon the left end of slide 140, and roller 151 is carried by a plate, 152, which is pivoted to the slide, the pin 153, upon which it is free to turn, simply passing down into slot 154 in the slide. At the rear end of plate 152 is a curved slot, 155.

156 is a bolt passing through slots 154 and 155. This bolt is preferably provided with a head on its under side of greater diameter than the width of slot 154, and with a nut or thumb-screw, 157, upon the upper side of the plate, by which the parts are tightened up after they have been adjusted.

It will be apparent that each movement of frame 133 toward the left, as seen in Fig. 3—that is, viewed from the right end of the machine—will cause slide 140 to move away from the point of view. It should be noted that the parts in Fig. 17 are illustrated from the same point of view as in Fig. 3.

Turning now to Figs. 1 and 3, it will be apparent that the movement of frame 133 toward the left in Fig. 3 will move slide 140 toward the left in Fig. 1, the effect of which will be to carry the bending and forming rollers nearer to the feed-rollers. This movement takes place at the instant that the feeding mechanism is operating. The wire, after leaving the feeding-rollers, passes back of left bending and forming roller, 150, partially around said roller, and is engaged by the front side of the right bending and forming roller, 151, as shown in Fig. 1. As already stated, the wire used in the machine is polygonal, preferably hexagonal—that is, wire having six sides. It is apparent that in passing between the bending and forming rollers opposite parallel sides of the wire will engage said rollers. The feeding-rollers simply act to draw the wire forward as it comes from the twisting mechanism. It is apparent, however, that in passing between the bending and forming rollers the spiral planes of the twisted wire must engage the faces of the rollers, so that the wire in being bent to the desired elliptical form of a hat-wire is also compelled to assume the predetermined amount of set. By means of bolt 156, passing through slots 154 and 155, I am enabled to adjust roller 151 both longitudinally and laterally relatively to roller 150. In making hat-wires having a high set the right roller is of course moved nearer to the left roller than in making hat-wires having a low set. Supposing, having adjusted roller 151 so as to give the desired amount of set to the completed wires, it should be found that the ends of the wire spring past each other after the completed wire has been severed, roller 151 would then be swung slightly toward the back of the machine as seen in Fig. 1, or toward the right, as seen in Fig. 17. If, on the other hand, the ends of the completed wire should spring farther apart than is desired, roller 151 would then be swung toward the front, as seen in Fig. 1, or toward the left, as seen in Fig. 17. It is apparent that in use the ends of the wire after being severed should be pretty close together, for the reason that if the hat-wires had to be sprung to any appreciable amount when joined together by the ordinary sleeve it is apparent that their form and set would be perceptibly changed.

The amount of set imparted to the hat-wire at the front and rear will depend upon the amount of twist imparted to the wire by the twisting mechanism, this amount of twist being predetermined by the adjustment of rollers 57 in arms 55 and 56 and the adjustment of lug 83 on arm 67, and this in turn, as already explained, will depend to a considerable extent upon the degree of temper of the wire.

It will of course be understood that the bends at the front and rear of the hat-brim, which determine the width of the oval, are made by what I term the "forward movement of the bending and forming mechanism"—that is, the movement of the mechanism carried by slide 140 toward the feeding mechanism. It is apparent that the farther forward the bending and forming rollers move—that is, the nearer they approach the feeding mechanism—the sharper will be the bends at the front and rear of the hat-brim, and consequently the narrower will be the oval. On the other hand, if a wide oval is required, less movement of frame 133 is required. The amount of movement of the bending and forming mechanism at each reciprocation depends upon the height of cams 136 upon disk 137, which engage roller 135 upon the frame.

It will be noticed in Fig. 3 that I have shown medium sized cams in full lines and larger and smaller cams in dotted lines. Should it be desired to have the oval widest at either front or back, dissimilar cams will be used, a low cam to form the wide end of the oval, and a higher cam on the other side of the disk to form the narrow end of the oval. If required, an abrupt bend can be given to the wire by a high cam, that will force the bending and forming mechanism close up to the feeding mechanism.

As soon as a completed hat-wire has been formed by the bending and forming mechanism, it is separated from the piece of wire in the machine by the cutting mechanism, which I will now describe. This cutting action is performed while the wire is moving forward. The cutting mechanism is illustrated in detail in Figs. 23 to 26, inclusive. (See also Figs. 2, 2ª, 3, and 3ª, and the accompanying description, as illustrating the attachment of the cutting mechanism to the frame-work of the machine.)

158 denotes the plate of the cutting mechanism, which is loosely secured to the plate 181 by screws 159, passing through slots 160 in plate 158, plate 181 being itself rigidly bolted to the frame-work, as shown in Fig. 3.

The cutting operation is performed by upper and lower cutters, designated, respectively, as 161 and 162. The forward end of plate 158 is cut away, leaving a circular opening, (indicated clearly in Fig. 25,) in which is seated a carrier, 163. The opening in plate 158 is in fact more than a complete half-circle, so that the carrier is held firmly in place—that is, against all but vertical movement—without additional devices.

164 denotes a flange on the carrier, which rests upon the top of plate 158, and 165 is a clamping-plate, the forward edge of which rests upon flange 164, and which is secured to plate 158 by screws 166. The inner and outer sides of the carrier form portions of circles concentric with the opening in plate 158, the purpose of which will presently be explained. The upper cutter is secured in extensions 167 of the carrier by means of screws 168, passing through slots 169 in said cutter and engaging the faces of the opposite extensions. The upper ends of the extensions project forward over the top of the upper cutter and are provided with set-screws 170, the ends of which bear against the back of the upper cutter and serve as an adjustment therefor.

171 denotes a block adapted to move vertically in the carrier, said opening being denoted by 172. The lower cutter is adjustably secured to block 171 by screws 173, passing through slots 174 in said cutter and engaging the block. The lower end of the lower cutter rests upon a flange or ledge, 175, projecting forward from the front of block 171. When the edge of the lower cutter becomes worn away in grinding, so that the space between the cutting-edges is too great, I raise the cutter as much as may be required by placing thin strips of metal between the lower edge of the cutter and the ledge. This, being an obvious mechanical expedient, has not been deemed to require illustration.

It will of course be apparent that in cutting different lengths and shapes of hat-wires from the piece of wire upon which the machine is operating it is frequently necessary to change the angle of the cutting-edges relatively to rollers 150 and 157. In order to do this it is simply necessary to loosen screws 166 and turn the carrier to the desired position. A position of these parts which I frequently use is illustrated in Figs. 1 and 24. In cutting certain styles of wires I preferably place the cutters in a plane parallel to the plane of rollers 150 and 151. Having adjusted the carrier, which of course carries both cutters to the desired position, it is secured there by tightening up screws 166.

176 denotes guides at the forward end of extensions 167, which project over the line of movement of the lower cutter and hold it firmly in place at the instant the act of cutting takes place.

177 denotes projections at the forward end of the opposite sides of the carrier, and 178 shoulders on the lower cutter which engage these projections, thereby limiting the downward movement of the cutter.

The operation of cutting is performed as follows:

Turning now to Fig. 3, 179 denotes a hammer at the upper end of a rod, 180. The head of this hammer passes through an opening in plate 181 (see dotted lines, Fig. 3) and delivers blows at predetermined times upon the bottom of block 171, thereby driving the lower cutter upward and severing the wire. The hammer is held at its normal position—that is, just below block 171—by a spring, 182, the upper end of which rests against the bottom of the hammer and the lower end against an abutment, 183, upon the right leg or any suitable portion of the frame-work. Rod 180 extends downward, and its lower end is pivoted to a rod, 184, which extends across the machine, and whose opposite end is pivoted to a bracket, 185.

186 denotes an abrupt bend or offset in rod 184, the purpose of which will presently be explained.

19 is a lug adjustably secured to the inner periphery of gear-wheel 7 and projecting inward far enough to engage rod 184.

The operation is as follows: This gear-wheel makes a complete revolution during the formation of each hat-wire, its rotation being from right to left, as shown by the arrow in Fig. 3. When lug 19 comes in contact with rod 184, said rod is carried downward, compressing spring 182. The downward movement of the rod and hammer is continued until lug 19, traveling inward on rod 184, passes off at the bend or offset 186. This releases rod 184 and allows the spring to recoil, forcing the hammer violently upward and causing it to strike block 171, as already explained.

It will of course be understood that the several mechanisms of the machine must be adjusted to correspond with each other, and that the cutting mechanism must be so adjusted as to operate at the exact moment that a completed wire is formed, the sleeve by which the two ends of the completed hat-wire are joined (not shown in the drawings) being always placed at about the center of one side of the hat. It is apparent, therefore, that the length of wire that passes the cutting mechanism between two operations of the cutters is of exactly the same length as the piece of wire drawn forward by two operations of the feeding mechanism, all of which will be referred to again in a brief description of the operation of the machine.

The timing of the cutting operation may be regulated by moving lug 19 on the inner periphery of gear-wheel 7, or by turning said gear-wheel slightly on its shaft, set-screws being provided whereby it may be locked at any desired position.

Turning now to Fig. 1, 188 denotes springs, the opposite ends of which are connected, respectively, to plate 158 and to some solid portion of the machine, their action being to draw plate 158 and the cutting mechanism forward toward the bending and forming mechanism, it having been stated already that plate 158 was loosely secured to plate 181 by screws passing through slots in said plate 158.

I have discovered in practice that much better results are secured by cutting the wire while it is moving forward and by so attaching the cutting mechanism that considerable vibration takes place when the blow of the hammer is delivered. It of course follows, as the blow of the hammer causes the lower cutter to strike the wire as it is moving forward, that the tendency of the cutting mechanism will be to move forward with the wire when the blow is delivered. I therefore provide springs 188 to draw the cutting mechanism back to its normal position and hold it there until the next blow is delivered. The forward movement of the cutting mechanism is slight, but the jar or vibration is quite sufficient to insure the perfect separation of the completed hat-wire from the main piece in the machine. Furthermore, as springs 188 draw the cutting mechanism backward—that is, toward the bending and forming mechanism—the instant after the blow is delivered it follows that there is no possibility that the end of the main piece of wire will escape from between the cutters. The actual position of the lower cutter in use is shown by the dotted lines in Fig. 26, the position in full lines being an intermediate position, which said cutter assumes during the instant that the blow is being delivered.

It will be seen that there is considerable space between the two cutters when the lower cutter has dropped down, it being entirely open in back of the cutters. This is in order that no matter what degree of set may be imparted to the hat-wires there shall be no stoppage or even friction upon the wire while passing between the cutters. In order that the entire operation of the machine may be clearly understood, I will briefly describe the several operations performed upon the wire and the several adjustments necessary to adapt the machine to the formation of all shapes and sizes of hat-wires.

The wire enters the machine at the left, as it appears in Figs. 1 and 2, and passes first through the left holding-clamp, the position of which is adjustable, then through the twisting-drum, in which is a gripping device, the position of the twisting-drum being also adjustable, then through the right holding-clamp, which is not adjustable, and thence to the feeding mechanism, by which it is drawn forward. The two holding-clamps constitute an essential part of the twisting mechanism. The feeding and the twisting mechanisms of course act alternately. The bending and forming mechanism placed at the right of the feeding mechanism acts simultaneously with the feeding mechanism, and the cutting mechanism acts at the completion of each alternate or second operation of the bending and forming mechanism. The feeding mechanism is operated by means of a link pivoted to a block in the crank-disk and certain other connections already fully described. Each operation of the feeding mechanism draws forward the exact quantity of wire required to form one-half of a hat-wire. The necessary adjustments of the feeding mechanism to different sizes of hat-wires is secured by adjusting the block in the crank-disk to which the link is pivoted. While the feeding mechanism has been operating, a rack has been carrying the twisting-drum backward against the power of a spiral spring or a weight, or both. During this time the right and left holding-clamps and the gripping device in the twisting-drum have been at their opened positions, so that the wire has been drawn freely forward by the feeding mechanism. The operation of the feeding mechanism ceases during the two periods of time that the pivotal point of the link to the crank-disk is passing its opposite dead-centers. At the instant that the feeding mechanism ceases to act the right and left holding-clamps and the gripping mechanism in the twisting-drum, all operated by rock-shaft 24, grip the wire firmly. The instant that the wire is gripped the mechanism that has been carrying the twisting-drum forward is tripped, which allows the spring or weight, whichever may be used, to act instantly to return the twisting-drum to its normal position. As the half hat-wire is gripped at its opposite ends by the right and left holding-clamps, and also midway between these points in the twisting-drum, it follows that more or less twist or torsion will be imparted to the wire, depending, as already explained, upon the adjustment of rollers 57 in arms 55 and 56 and the corresponding adjustment of lug 83 on rod 67. The instant this forward movement of the twisting-drum, by which the wire is twisted, has taken place both of the holding-clamps and the gripping device in the twisting-drum are released. By this time link 38 will have passed its dead-center and the feeding mechanism will act again. While the feeding mechanism is acting to draw forward the necessary amount of wire to form the second half of the hat-wire, the bending and forming mechanism is acting upon the half of the hat-wire that has just been twisted.

If a completed hat-wire is required to have a narrow oval, the slide carrying the bending and forming rollers is given a greater movement than when a wide oval is required. This is accomplished by changing the cams which actuate the slide carrying the bending and forming mechanism. The left bending and forming roller is fixed and the right one adjustable relatively thereto. If a greater or less amount of set is required at the front and rear of the hat-rim, it is secured by moving the right roller nearer to or farther from the left roller, and if changes are required to cause the ends of the severed hat-wires to meet approximately the necessary adjustment may be effected by swinging the right bending and forming roller either side of the central line of the machine, as may be required, depending on whether the ends lap over or fail to meet.

It will of course be understood by those familiar with wire-working that no two coils of wire work alike, some being much more refractory than others. It is therefore necessary that sensitive adjustments should be provided for all parts of the machine, particularly those parts which give the set to the completed hat-wire—in other words, the twisting and the bending and forming mechanisms. It will have been noted that two adjustments coact to produce this result: first, the adjustment of the twisting mechanism, which gives more or less twist to each half hat-wire; and, second, the adjustment of the right bending and forming roller relatively to the left bending and forming roller, which, without making any change in the amount of twist imparted to the wire, will give more or less set at front and rear.

The cutting mechanism, as already stated, is so arranged as to act when the wire is moving forward, and the entire mechanism, instead of being rigidly fixed in place, is so attached as to be capable of slight reciprocatory movement at the instant each blow is struck, which gives sufficient jar or vibration to the parts to insure the perfect separation of each completed hat-wire, and, furthermore, that the end of the piece being formed shall not slip out from between the cutters.

Having thus described my invention, I claim—

1. The combination, with oscillating shaft 30, carrying a gear, 29, the feed-rollers, feed-gears, and feed-pinions, of pins 45 on opposite sides of the oscillating shaft, each of which carries a gear engaging gear 29, a ratchet under said gear rigidly secured thereto, a disk under said ratchet carrying pawls engaging the ratchet, the teeth of the ratchets being inclined in opposite directions, and a gear under the disk engaging one of the feed-pinions, whereby oscillation of shaft 30 in either direction carries the feed-rollers forward by driving the mechanism on one of the pins 45, the mechanism on the other pin being driven, the return movement of shaft 30 carrying the feed-rollers forward again through the operation of the mechanism on the other pin 45, the driving mechanism in the forward movement being driven during the return movement.

2. The combination, with oscillating shaft 30, carrying a gear, 29, shafts 42, carrying the feed-rollers, feed-gears, and feed-pinions, of pins 45, having journaled thereon gears 46, engaging gear 29, ratchets under said gears secured thereto and having teeth inclined in opposite directions, disks under said ratchets carrying spring-pawls engaging the ratchets, and gears under the disks engaging the feed-pinions.

3. Shafts 42, carrying the feed-rollers, the feed-gears which engage each other, and the feed-pinions not in engagement, in combination with pins having journaled thereon gears 46, under said gears ratchets rigidly secured thereto and having teeth inclined in opposite directions, under said ratchets disks carrying pawls which engage the ratchets, and under said disks gears rigidly secured thereto which engage the respective feed-pinions, whereby forward movement of either of the gears 46 will actuate both of the feed-rollers.

4. Shafts 42, carrying the feed-rollers, the feed-gears which engage each other, and the feed-pinions, in combination with gear 29, gears 46, ratchets 47, moving therewith, disks under said ratchets carrying pawls which engage the ratchets, and gears 49 under said disks and connected thereto, which engage the respective feed-pinions, the teeth of said ratchets being inclined in opposite directions, so that when either of gears 46 is driven the corresponding gear 49 will be driven and will carry both feed-rollers through the engagement of the feed-pinion with said gears 49 and of the feed-gears with each other.

5. The feed-rollers, feed-gears engaging each other, the feed-pinions, and gear 29, in combination with gears 46, ratchets under said gears which are secured thereto and are provided with teeth inclined in opposite directions, disks carrying pawls inclined in opposite directions to engage said ratchets, and gears 49, rigidly secured to said disks, whereby, when either disk 46 is driving the feed-rollers through the corresponding pawls, ratchet, and gear 49, the other gear 49 will be driven in the opposite direction, and the pawls corresponding therewith will drag over the face of the ratchet on that side.

6. The oscillating shaft carrying gear 29, the feed-rollers, feed-gears engaging each other, and the feed-pinions, in combination with gears 46, engaging gear 29, ratchets having teeth inclined in opposite directions, pawls corresponding therewith, and gears 49, engaging the feed-pinions, whereby, when either gear 46 is driving the feed-rollers through the engagement of the corresponding gear 49 with a feed-pinion, the other gear 46 is being driven, but the corresponding gear 49 and disk will be carried in the opposite direction, the pawls being dragged over the face of the ratchet.

7. Shafts 42, journaled in brackets 43 above the bed and bracket 44 below the bed, and carrying the feed-rollers, feed-gears, and feed-pinions, and pins 45, seated in the bed and bracket 44, in combination with gear 29, gears 46, ratchets 47, having teeth inclined in opposite directions, disks 48, carrying pawls engaging the ratchets, and gears 49 under said disks, which engage the feed-rollers.

8. Shafts 42, journaled in brackets 43 above the bed and bracket 44 below the bed, and carrying the feed-rollers, feed-gears, and feed-pinions, and pins 45, seated in the bed and bracket 44, in combination with gears 46, ratchets 47, having teeth inclined in opposite directions, disks 48, carrying pawls engaging the ratchets, gears 49 under said disks, which engage the feed-rollers, and an oscillating shaft carrying a gear, 29, engaging gears 46, as and for the purpose set forth.

9. The combination, with the feed-rollers, feed-gears, and feed-pinions, shaft 30, carrying gear-wheel 29 and pinion 31, and intermediate sets of alternately-acting mechanism which connect gear 29 with the feed-pinions, of a reciprocating rack engaging pinion 31, whereby the feed-rollers are actuated.

10. The combination, with the feed-rollers, shaft 30, having gear-wheel 29 and pinion 31, and intermediate mechanism, substantially as described and shown, of rack 32, lever 37, the crank-disk, and links 36 and 38, whereby each rotation of the crank-disk carries the rack forward and back, thereby actuating the feeding mechanism twice.

11. The combination, with the feed-rollers, oscillating shaft 30, carrying pinion 31, and intermediate sets of mechanism acting alternately, which carry the feed-rollers forward during both movements of shaft 30, of a rack engaging pinion 31, lever 37, a crank-disk having an adjustable block, a link connecting one end of the lever with the rack, and a link connecting the other end of the lever with the adjustable block, whereby adjustment of said block imparts more or less movement to the feeding mechanism and determines the amount of wire drawn forward during each movement.

12. The crank-disk having a sliding block and a gage for adjusting said block, curved and recurved lever 37, rack 32, link 38, connecting one end of said lever with the block, and link 36, connecting the other end with the rack, in combination with the feed-rollers, shaft 30, having a pinion engaged by said rack, and intermediate sets of mechanism, substantially as described and shown, which act alternately and carry the feed-rollers forward during the forward and backward movements of the rack.

13. In a wire bending and forming machine, the combination, with shaft 30, having a gear for actuating the feeding mechanism, and a pinion, 31, and a slide having a rack, of a crank-disk having an adjustable block, and intermediate mechanism, substantially as described, between said crank-disk and rack, whereby reciprocatory movement is imparted to the rack.

14. In a wire bending and forming machine, the combination, with the feed-rollers, feed-gears 54, engaging each other, and the feed-pinions, of oscillating gear-wheel 29 and alternate sets of mechanism, each consisting of a gear, 46, engaging gear 29, a ratchet, 47, connected thereto, a disk having pawls engaging said ratchet, and a gear, 49, connected to the disk and engaging one of the feed-pinions, the teeth of said ratchets being inclined in opposite directions and the pawls arranged to correspond, whereby movement of gear 29 in either direction will carry the feed-wheels forward.

15. In a wire bending and forming machine, the combination, with the feed-rollers, feed-gears 54, engaging each other, and the feed-pinions, of oscillating gear-wheel 29 and alternate sets of mechanism, each consisting of a gear, 46, engaging gear 29, a ratchet, 47, connected thereto, a disk having pawls engaging said ratchet, lugs 52, and springs acting to hold the pawls in operative position, and a gear, 49, connected to the disk and engaging one of the feed-pinions, as and for the purpose set forth.

16. In a wire bending and forming machine, the combination, with suitable feeding mechanism, of holding-clamps which engage the wire at predetermined times, an oscillatory twisting-drum through which the wire passes, and a grip in said drum midway between the clamps, whereby the wire is twisted by movement of the drum.

17. The combination, with the holding-clamps, of slides 95, by which they are operated, and a rock-shaft, 24, having arms 96, whereby the slides are reciprocated.

18. Block 85, having recess 88, with a central boss in the bottom having an opening to receive the wire, in combination with block 91, having a recess to receive boss 89, and slide 95, having inclines 101 and 103, whereby block 91 is raised and lowered.

19. Block 85, having a recess in its top, a central boss having an opening to receive the wire, and a vertical block, 91, sliding in said recess and having a recess in its bottom to receive said boss, in combination with a slide having inclines which raise and lower block 91.

20. Block 85, having a recess with ways 90, a boss at the bottom having an opening to receive the wire, and a block, 91, sliding on said ways and having a recess in its bottom to receive said boss, in combination with slide 95, having incline 101, to raise the block, and a projection with an incline, 103, whereby block 91 is forced down upon the wire when the slide is drawn outward.

21. Block 85, having ways 90, and boss 89, with an opening to receive the wire, and block 91, sliding on said ways and having a recess to receive said boss, in combination with slide 95, having inclines 101 and 103 and slots 98 and 97, guide-screws 99, passing through said slides, and an oscillating arm, 96, engaging slot 97.

22. The combination, with block 85, having boss 89, with an opening to receive the wire, vertical block 91, having a recess in its bottom to receive the boss, and a slide, 95, having inclines by which block 91 is raised and lowered, of guides 94 on opposite sides of said block.

23. Block 85, having boss 89, with an opening to receive the wire, a vertical block, 91, having a recess to receive said boss, and an angular slot in line with the opening through the boss, in combination with slide 95, having an incline which forces block 91 downward to clamp the wire in the slot when the slide is moved in one direction and another incline which raises said block to release the wire when the slide is moved in the opposite direction.

24. The combination, with block 85, having bracket 85ª, threaded as described, and a recess, 88, with a boss, 89, of block 91, having a recess to receive the boss, and a threaded shaft engaging said bracket, whereby block 85 may be adjusted to any desired position.

25. The bed having extension 21, with slot 87, block 85, having bracket 85ª, a recess, 88, and boss 89, and block 91, having a recess to receive said boss, in combination with a threaded shaft engaging said bracket, whereby block 85 may be adjusted, and a screw passing through the slot in the extension and engaging said block, whereby it is locked in position after adjustment.

26. The twisting-drum having within it a cylindrical piece secured thereto, which is provided with a recess having at its bottom a boss, said boss having a hole through which the wire passes, and a block, 111, having an opening in its bottom to receive said boss, in combination with a slide, 110, for raising and lowering said block, and mechanism for reciprocating the slide.

27. The twisting-drum having secured within it a cylindrical piece provided with a recess having at its bottom a boss, said boss having a hole through which the wire passes, and a block, 111, having an opening in its bottom to receive said boss, and a slot for the wire, in combination with a slide, 110, connected to said block by diagonal dovetails, and mechanism for reciprocating the slide.

28. The twisting-drum, cylindrical piece 104, secured thereto, which is provided with guides for the wire, and a recess with a boss at its bottom having an opening for the wire, in combination with a sliding block having a recess in its bottom to receive the boss, a slide for raising and lowering the block, and reciprocating plunger 108, to which the slide is connected, whereby the wire is clamped at predetermined times.

29. The twisting-drum, cylindrical piece 104, constructed as described, block 111, and the slide and plunger, in combination with a sliding plate, 116, which engages the plunger, and a crown-ratchet, 120, whereby the sliding plate and plunger are forced forward, as and for the purpose set forth.

30. The twisting-drum, cylindrical piece 104, constructed as described, block 111, and the slide and plunger, in combination with sliding plate 116, which forces the plunger forward, and sliding cam 127, engaging a flange on said plunger, whereby it is retracted.

31. The twisting-drum and cylindrical piece 104, constructed as described, block 111, and the slide and plunger, in combination with sliding plate 116, which forces the plunger forward, sliding cam 127, engaging a flange on said plunger, whereby it is retracted, said cylindrical piece being rigidly secured to the twisting-drum, and the plunger provided with a key 115, engaging a groove in the cylindrical piece, whereby said parts are held against independent rotary movement.

32. The twisting-drum, cylindrical piece 104, secured thereto, and standard 77, in which said parts are journaled, in combination with gripping mechanism, substantially as described, within the drum, a grooved reciprocating plunger for actuating the gripping mechanism, and a sliding plate having a bearing engaging the groove in the plunger.

33. The plunger having a flange, 108ª, a collar, 129, and a groove, 119, in combination with a sliding plate having a bearing engaging said groove, a crown-ratchet whose teeth force the sliding plate forward, carrying the plunger, and reciprocating cam 127, engaging said plunger and collar, whereby the plunger is retracted, substantially as and for the purpose set forth.

34. The plunger having a flange, 108ª, a collar, 129, and a groove, 119, in combination with a sliding plate having a bearing engaging said groove and a roller, 117, and a crown-ratchet whose teeth engage said roller at predetermined times to force the plunger forward, as and for the purpose set forth.

35. The plunger having a groove, 119, and the sliding plate having a bearing engaging said groove, and a roller, 117, in combination with a crown-ratchet, 120, whose teeth engage the roller, a ratchet, 121, secured to the crown-ratchet, and a reciprocating hooked pawl, whereby intermittent rotary motion is imparted to said ratchets, substantially as and for the purpose set forth.

36. The combination, with the plunger, the sliding plate having a bearing engaging said plunger, and a roller, 117, crown-ratchet 120, engaging the roller, and ratchet 121, secured to the crown-ratchet, of rock-shaft 24, having an arm, 123, and a hooked pawl, 122, pivoted to said arm and engaging ratchet 121, substantially as and for the purpose set forth.

37. The combination, with the plunger having flange 108ª and collar 129, of rock-shaft 24, having arm 128, and double cam 127, pivoted thereto, which engages said flange, whereby the plunger is retracted when the cam is forced forward, substantially as and for the purpose set forth.

38. The plunger having flange 108ª, the sliding plate having a bearing engaging said plunger, crown-ratchet 120, engaging the sliding plate, and ratchet 121, secured to the crown-ratchet, in combination with rock-shaft 24, having arms 123 and 128, a hooked pawl pivoted to one of said arms and engaging ratchet 121, and a cam, 127, pivoted to the other arm and engaging the flange, said arms being so pivoted to the rock-shaft that when the cam moves forward the hooked pawl passes over the face of the ratchet, and when the pawl is carrying the ratchet the cam is moving backward out of operative position, substantially as and for the purpose set forth.

39. The combination, with the plunger, the sliding plate having a bearing engaging the plunger, and a roller, 116, of the crown-ratchet engaging the roller, ratchet 121, secured thereto, a hooked pawl whereby the ratchets are carried forward, and friction-spring 126, whereby the ratchets are held stationary when the pawl moves backward over ratchet 121, substantially as and for the purpose set forth.

40. The sliding frame having bearings 77 and 125, the twisting-drum, and the gripping mechanism, constructed as described, in combination with detachable guide-pins 124 in said bearings, having longitudinal openings to receive the wire.

41. The stationary holding-clamp, frame 78, carrying the twisting mechanism and having a bracket, 132, and block 85, carrying the adjustable holding-clamp and having a bracket, 85ª, in combination with shaft 26, having a screw-thread, 130, engaging bracket 85ª, and a thread, 131, of half the pitch, engaging bracket 132, whereby rotation of said shaft in either direction will move the twisting mechanism and the adjustable holding-clamp, the position of the twisting mechanism being always midway between the holding-clamps.

42. The bed and extension having, respectively, slots 79 and 87, the stationary holding-clamp secured to the bed, frame 78, carrying the twisting mechanism and having a bracket, 132, and block 85, carrying the adjustable holding-clamp and having a bracket, 85ª, in combination with shaft 26, having a screw-thread, 130, engaging bracket 85ª, and a screw-thread, 131, of half the pitch, engaging bracket 132, whereby rotation of said shaft in either direction will move the twisting mechanism, and the adjustable holding-clamp and screws 80 and 86, whereby the parts are locked in place after adjustment.

43. The combination, with the holding-clamps and the twisting drum having gear-teeth on its periphery and a grip midway between the holding-clamps, of a reciprocating rod having rack-teeth engaging the drum.

44. The combination, with the holding-clamps and the twisting-drum having a grip midway between said clamps, of a rack for imparting movement to the twisting-drum in one direction and a spring or weight which causes the return or forward movement of the twisting-drum.

45. The holding clamps, the twisting-drum having a grip midway between said clamps, and rock-shaft 24, having arms 96, 123, and 128, for operating the clamps and grip, and an arm, 84, in combination with a reciprocating rod having rack-teeth engaging the drum, and lugs 82 and 83, which engage arm 84, to lock and unlock the holding clamps and grip.

46. The combination, with the holding-clamps, the twisting-drum having a grip midway between said clamps, and a reciprocating-rod having rack-teeth engaging the twisting-drum and lugs 82 and 83, of rock-shaft 24, carrying arms which operate said clamps and grip, and an arm, 84, which is engaged by said lugs to oscillate the rock-shaft, as and for the purpose set forth.

47. The holding-clamps, the twisting-drum having a grip midway between said clamps, and a reciprocating rod having rack-teeth engaging the twisting-drum and lugs 82 and 83, in combination with a spring surrounding said rod, which is compressed when the drum is turned backward, and rock-shaft 24, carrying arms which operate the clamps and grip, and an arm, 84, which is engaged by lug 83 at the completion of the backward movement of said rod to lock the clamps and grip and by lug 82 at the end of the forward movement to unlock them again after the wire has been twisted.

48. The twisting-drum, rod 67, having rack-teeth engaging said drum, and a coil-spring surrounding said rod and bearing against a collar at its outer end, in combination with shaft 61, having arms 63 and 65, said arm 65 being connected to rod 67 by a link, and arm 63 being provided with an offset, 64, and shaft 15, carrying arms 55 and 56, provided with rollers which engage arm 63 from below and raise it until the roller reaches the offset, when the spring acts to return the parts to their normal position.

49. The combination with the twisting-drum, rod 67, having rack-teeth engaging the drum, and a spring, 73, surrounding said rod, of oscillating arms 63 and 65, the former having an offset, 64, and the latter connected by a link to rod 67, and rotating arms 55 and 56, carrying rollers, which engage arm 63 from below and raise it until the roller in engagement reaches the offset.

50. The combination, with the twisting-drum and rod 67, having a rack engaging the drum, of shaft 61, carrying arms 63 and 65, link 66, and shaft 15, carrying arms 55 and 56, adjustable relatively to each other, said arms being provided with adjustable rollers 58, adapted to engage arm 63.

51. The combination, with the twisting-drum, rod 67, having rack-teeth engaging the drum, a spring surrounding said rod and bearing against its outer end, and a sleeve, 72, inclosing the spring, of arms 63 and 65, link 66, and rotating arms having rollers engaging rod 63.

52. The combination, with the twisting-drum, brackets 68, a key, 70, in one of said brackets, a rod, 67, having a groove engaged by said key, and rack-teeth engaging the twisting-drum, of arms 63 and 65, links 66, and rotating arms having rollers adapted to engage arms 63.

53. The combination, with the twisting-drum and grip, the holding-clamps, and rock-shaft 24, having arms which operate said clamps and grip, and an arm, 84, of rod 67, having rack-teeth engaging the drum, and lugs 82 and 83, the latter being adjustable, and operating mechanism whereby said rod is moved in one direction and the clamp and grip locked at the end of the movement.

54. The combination, with the twisting-drum and grip, the holding-clamps, and rock-shaft 24, having arms which operate said clamps and grip, and an arm, 84, of rod 67, having rack-teeth engaging the drum and lugs 82 and 83, a coil-spring surrounding said rod and bearing against a collar at its outer end, and operating mechanism whereby said rod is moved in one direction against the power of the spring, and the clamps and grip are locked by lug 83 at the end of the movement and unlocked by lug 82 when the rod is turned by said spring.

55. The holding-clamps and twisting-drum having a grip midway between said clamps, in combination with a reciprocating rod engaging said drum, a spring on said rod which is compressed when the rod moves backward, and mechanism for locking the clamps and grip upon the wire at the end of the backward movement and for releasing them at the end of the forward movement after the wire has been twisted.

56. The holding-clamps, the twisting-drum having a grip midway between said clamps, and adjusting mechanism for the twisting-drum and one of the holding-clamps, whereby the grip is kept midway between the clamps without regard to the length of wire being operated upon, in combination with a reciprocating rod engaging said drum, a spring on said rod which is compressed when the rod moves backward, and mechanism for locking the clamps and grip upon the wire at the end of the backward movement and for releasing them at the end of the forward movement after the wire has been twisted.

57. The holding-clamps and twisting-drum having a grip midway between said clamps, and adjusting mechanism for the twisting-drum and one of the holding-clamps, whereby the grip is kept midway between the clamps without regard to the length of wire being operated upon, in combination with a reciprocating rod engaging said drum, a spring on said rod which is compressed when the rod moves backward, mechanism for locking the clamps and grip upon the wire at the end of the backward movement and then releasing them at the end of the forward movement after the wire has been twisted, and feeding mechanism acting alternately with the twisting mechanism, whereby the wire is drawn forward after being twisted.

58. The twisting-drum having a grip within it, a sliding frame, 78, in which it is journaled and which is provided with a bracket, 132, a reciprocating rack for oscillating said drum, and the stationary and adjustable holding-clamps, in combination with shaft 26, having a screw-thread engaging the adjustable holding-clamp, and a screw-thread of half the size engaging bracket 132, as and for the purpose set forth.

59. The twisting-drum having a grip within it, a reciprocating rack for oscillating said drum, having lugs 82 and 83, and the stationary and adjustable holding-clamps, in combination with rock-shaft 24, having adjustable arms for operating the holding-clamps and grip, and an arm, 84, adapted to be engaged by lugs 82 and 83, as and for the purpose set forth.

60. The combination, with the feeding mechanism and the twisting mechanism, of reciprocating slide 140, carrying bending and forming rollers 150 and 151.

61. The combination, with the feeding mechanism, of reciprocating slide 140, carrying roller 150, and back of said roller a roller, 151, adjustable relatively thereto.

62. In a machine for bending and forming wire, reciprocating slide 140, having at its forward end a roller, 150, in combination with an adjustable plate, 152, carrying roller 151.

63. Reciprocating slide 140, carrying roller 150 and having a slot, 154, in combination with plate 152, having at its forward end a roller, 151, pin 153, passing through said plate and engaging the slot, and a bolt and nut for locking said plate at any desired adjustment.

64. Reciprocating slide 140, carrying a roller, 150, and having a slot, 154, in combination with plate 152, having at its forward end a roller, 151, and at its rear end a curved slot, 155, pin 153, passing through said plate and engaging slot 154, a bolt, 156, passing through slots 154 and 155, and a nut engaging said bolt, whereby roller 151 may be adjusted both longitudinally and laterally relatively to roller 150.

65. Reciprocating plate 144, having slot 146, and block 147, adapted to slide in said slot, in combination with plate 142, having slot 143, and slide 140, carrying the bending and forming rollers and provided on its under side with a boss engaging slot 143, and a pin engaging the block in slot 146, whereby the reciprocation of plate 144 causes the slide to reciprocate at right angles thereto.

66. Sliding frame 133, carrying roller 135, slide 140, carrying the bending and forming rollers, and intermediate connecting mechanism whereby reciprocation of the frame causes the slide to reciprocate at right angles thereto, in combination with disk 137, carrying cams 136, adapted to engage said roller to move the frame forward, and spring 138, whereby the frame is returned to its normal position.

67. The combination, with slide 140, carrying the bending and forming rollers, sliding frame 133, having roller 135, and intermediate connecting mechanism, substantially as described, of disk 137, carrying adjustable cams 136, adapted to engage said roller to move the frame, and spring 138, whereby the frame is returned to its normal position.

68. In a machine for bending and forming polygonal wire, the combination, with feeding mechanism and twisting mechanism, of a reciprocating slide carrying bending and forming rollers between which the wire is passed, means for moving the slide forward, and means for simultaneously actuating the feeding mechanism, whereby, when opposite planes of the twisted wire are in contact with the faces of the rollers, any desired set may be given to the wire, depending upon the adjustment of said rollers relatively to each other.

69. In a machine for bending and forming polygonal wire, the combination, with the feeding mechanism and twisting mechanism, of a reciprocating slide carrying at its forward end a roller, 150, and having secured thereto a plate carrying a roller, 151, adjustable both longitudinally and laterally relatively to roller 150, whereby any desired set may be given to the wires and their ends may be caused to meet.

70. The combination, with the feeding mechanism and the twisting mechanism, of bending and forming rollers carried by a reciprocating slide which advances while the feeding mechanism is acting, sliding frame 133, carrying a roller, 135, intermediate connecting mechanism for transmitting the motion of the frame to the slide, and a disk carrying cams which engage said roller and force the frame forward, the amount of movement of said frame and consequently of the bending and forming rollers toward or from the feeding mechanism being governed by the height of the cams, whereby the oval of the hat-wire may be widened or narrowed, as required.

71. Slide 140, carrying the bending and forming rollers and having boss 148 and stud 149, plate 142, having a slot engaged by said boss, and a plate, 144, having a diagonal slot and a sliding block therein engaged by said stud, in combination with sliding frame 133, and a bracket, 145, adjustably secured to said frame and carrying plate 144.

72. In a wire bending and forming machine, the combination, with slide 140, having slot 154 and carrying roller 150, of a plate, 152, carrying roller 151 and having a curved slot, 155, pin 153, passing through the plate and engaging slot 154, bolt 156, engaging slots 154 and 155, and a nut engaging said bolt, whereby the parts are locked in position after adjustment.

73. The combination, with the feeding mechanism and the bending and forming rollers carried by a reciprocating slide, 140, of reciprocating plate 158, carrying fixed and movable cutters between which the wire passes, springs 188, for holding said plate to its normal position, and a hammer which strikes the lower cutter while the wire is moving forward.

74. In a wire bending and forming machine, the combination, with reciprocating slide 140, carrying the bending and forming rollers, of plate 158, loosely held in place, springs acting to draw said plate toward the bending and forming mechanism, stationary and movable cutters carried by plate 158, between which the formed wire passes, and a hammer adapted to deliver a blow upon the movable cutter to sever the wire at predetermined times.

75. In a wire bending and forming machine, plate 181, secured to the frame-work, plate 158, carrying stationary and movable cutters between which the formed wire passes, and having slots 160, screws passing through said slots, whereby plate 158 is loosely secured to plate 181, and springs acting to hold it at its forward position, in combination with a hammer which strikes the movable cutter at predetermined times to sever the wire.

76. The combination, with plate 158, loosely held in place and carrying fixed and movable cutters between which the wire passes, and springs for holding said plate at its forward position, of a hammer carried by a rod, 180, a cross-rod, 184, having a bend or offset, 186, one end being pivoted to rod 180 and the other end pivoted at the opposite side of the machine, gear-wheel 7, having cam 19, and a spring, 182, under the hammer, acting to throw the hammer upward against the lower cutter, whereby at each rotation of said gear rod 184 is drawn downward by cam 19, compressing spring 182 until the cam passes off at bend 186, when the spring acts to force the hammer upward against the movable cutter.

77. The combination, with the stationary cutter, the movable cutter, and rod 180, having a hammer at its upper end and a coil-spring under said hammer, of cross-rod 180, having bend 186, one end of said rod being pivoted to rod 180 and the other end to the opposite side of the machine, and gear 7, having cam 19, adapted to engage the cross rod and draw it down until the cam passes off at the bend, as and for the purpose set forth.

78. The combination, with loose plate 158, carrying fixed and movable cutters, springs 188, acting to hold said plate in operative position, and rod 180, having a hammer at its upper end and a coil-spring under said hammer, of cross-rod 180, having bend 186, one end of said rod being pivoted to rod 180 and the other end to the opposite side of the machine, and a gear, 7, having a cam, 19, adapted to engage the cross-rod and draw it down until the cam passes off at the bend, whereby the blow of the hammer may be delivered while the wire is moving forward, the vibration of plate 158 will insure the perfect separation of the wire, and springs 188 will draw the cutters forward, so that the uncut end cannot pass out.

79. The combination, with the bending and forming mechanism, loose plate 158, and springs 188, which draw said plate toward the bending and forming mechanism, of carrier 163, adjustably secured to plate 158, an upper cutter secured to said carrier, and a vertically-movable block secured to the carrier to which the lower cutter is attached, and a hammer which strikes said block and forces the lower cutter upward to sever the wire.

80. The combination, with the bending and forming mechanism, loose plate 158, and carrier 163, secured to said plate and adjustable in the horizontal plane, of an upper cutter secured to the carrier and a lower cutter carried by a vertically-movable block secured to the carrier.

81. The bending and forming mechanism, plate 158, the carrier having flange 164, and clamping-plate 165, whereby the carrier is adjustably held in place, in combination with an upper cutter secured to the carrier and a lower cutter carried by a vertically-movable block which is secured to the carrier.

82. In a wire bending and forming machine, plate 158, and carrier 163, adjustably secured to said plate and having an opening, 172, and projecting ends 177, in combination with an upper cutter secured to the carrier and a vertically-movable block, 171, carrying the lower cutter, which is provided with shoulders engaging said projecting ends, whereby the downward movement of said block and cutter is limited.

83. Plate 158, the carrier having opening 172 and extension 167, provided with guides 176, and an upper cutter secured to said carrier, in combination with vertically-movable block 171, carrying the lower cutter.

In testimony whereof I affix my signature in presence of two witnesses.

SAMUEL T. NEWMAN.

Witnesses:
A. M. WOOSTER,
BERTHA E. LEE.